United States Patent
Paige, II et al.

(10) Patent No.: US 10,287,897 B2
(45) Date of Patent: May 14, 2019

(54) TURBINE ROTOR BLADE ASSEMBLY AND METHOD OF ASSEMBLING SAME

(75) Inventors: Anthony Reid Paige, II, Cincinnati, OH (US); Michael James Verrilli, Loveland, OH (US); Joshua Brian Jamison, Middletown, OH (US); Mark Eugene Noe, Morrow, OH (US); Paul Izon, Morrow, OH (US); Mark Willard Marusko, Springboro, OH (US)

(73) Assignee: General Electric Company, Schenectady, NY (US)

(*) Notice: Subject to any disclaimer, the term of this patent is extended or adjusted under 35 U.S.C. 154(b) by 1401 days.

(21) Appl. No.: 13/228,142

(22) Filed: Sep. 8, 2011

(65) Prior Publication Data

US 2013/0064668 A1    Mar. 14, 2013

(51) Int. Cl.
*F01D 5/22* (2006.01)
*F01D 5/28* (2006.01)
(Continued)

(52) U.S. Cl.
CPC ........... *F01D 5/284* (2013.01); *F01D 5/22* (2013.01); *F01D 5/3007* (2013.01);
(Continued)

(58) Field of Classification Search
CPC ... F01D 5/22; F01D 5/26; F01D 5/282; F01D 11/008; Y10S 416/50
(Continued)

(56) References Cited

U.S. PATENT DOCUMENTS 3,037,741 A    6/1962   Tuft
3,181,835 A *  5/1965   Davis ............................ 416/145
(Continued)

FOREIGN PATENT DOCUMENTS

CN    1060890 A    5/1992
CN    1550642 A    12/2004
(Continued)

OTHER PUBLICATIONS

PCT Search Report and Written Opinion issued in connection with Related PCT Application No. PCT/US2013/045635 dated Sep. 12, 2013.
(Continued)

*Primary Examiner* — Kayla McCaffrey
(74) *Attorney, Agent, or Firm* — General Electric Company; William Andes

(57) ABSTRACT

A rotor blade assembly for a rotor of a gas turbine engine having an axis of rotation includes a shank portion formed from a ceramic matrix composite (CMC) material. The rotor blade assembly also includes a platform portion formed from a substantially similar CMC material as that of the shank portion. The platform portion is coupled to the shank portion. The platform portion and the shank portion cooperate to at least partially define two opposing side portions of the rotor blade assembly. The opposing side portions are angularly separated with respect to the axis of rotation. The rotor blade assembly further includes a damper retention apparatus. The damper retention apparatus is coupled to the shank portion. The damper retention apparatus includes at least one angled bracket apparatus extending toward a circumferentially adjacent rotor blade assembly.

11 Claims, 35 Drawing Sheets

(51) Int. Cl.
*F01D 11/00* (2006.01)
*F01D 5/30* (2006.01)
*F01D 11/08* (2006.01)

(52) U.S. Cl.
CPC ............ *F01D 11/006* (2013.01); *F01D 11/08* (2013.01); *F05D 2300/6033* (2013.01); *Y02T 50/672* (2013.01); *Y10T 29/49321* (2015.01)

(58) Field of Classification Search
USPC ...................................... 416/190, 193 A, 500
See application file for complete search history.

(56) References Cited

U.S. PATENT DOCUMENTS

| | | | |
|---|---|---|---|
| 3,887,298 A * | 6/1975 | Hess et al. ................ | 416/220 R |
| 4,872,812 A * | 10/1989 | Hendley et al. ............. | 416/190 |
| 5,205,713 A | 4/1993 | Szpunar et al. | |
| 5,261,790 A * | 11/1993 | Dietz et al. ............... | 416/193 A |
| 5,281,097 A | 1/1994 | Wilson et al. | |
| 5,284,421 A * | 2/1994 | Chlus et al. ................. | 416/248 |
| 5,478,207 A | 12/1995 | Stec | |
| 5,749,705 A | 5/1998 | Clarke et al. | |
| 5,785,499 A * | 7/1998 | Houston et al. ............. | 416/248 |
| 5,820,346 A | 10/1998 | Young et al. | |
| 6,171,058 B1 * | 1/2001 | Stec .......................... | 416/193 A |
| 6,299,410 B1 | 10/2001 | Hilbert et al. | |
| 6,354,803 B1 | 3/2002 | Grover et al. | |
| 6,506,016 B1 | 1/2003 | Wang | |
| 6,932,575 B2 | 8/2005 | Surace et al. | |
| 7,097,429 B2 | 8/2006 | Athans et al. | |
| 7,121,800 B2 * | 10/2006 | Beattie .......................... | 416/190 |
| 7,121,801 B2 | 10/2006 | Surace et al. | |
| 7,306,826 B2 | 12/2007 | Subramanian et al. | |
| 7,322,797 B2 | 1/2008 | Lee et al. | |
| 7,374,400 B2 * | 5/2008 | Boswell ..................... | 416/97 R |
| 7,467,924 B2 * | 12/2008 | Charbonneau et al. .. | 416/193 A |
| 7,510,379 B2 * | 3/2009 | Marusko et al. ............. | 416/230 |
| 9,022,733 B2 | 5/2015 | Coupe et al. | |
| 2004/0228731 A1 | 11/2004 | Lagrange et al. | |
| 2005/0158171 A1 | 7/2005 | Carper et al. | |
| 2007/0072007 A1 | 3/2007 | Carper et al. | |
| 2007/0148000 A1 | 6/2007 | Marusko et al. | |
| 2009/0010762 A1 | 1/2009 | Caucheteux et al. | |
| 2011/0027098 A1 | 2/2011 | Noe et al. | |
| 2012/0055609 A1 | 3/2012 | Blanchard et al. | |

FOREIGN PATENT DOCUMENTS

| | | |
|---|---|---|
| CN | 101294501 A | 10/2008 |
| EP | 0475428 A1 | 3/1992 |
| EP | 2 108 785 A2 | 10/2009 |
| EP | 2392778 A2 | 12/2011 |
| EP | 2570600 A2 | 3/2013 |
| WO | 2011005337 A1 | 1/2011 |

OTHER PUBLICATIONS

PCT Search Report and Written Opinion issued in connection with Related PCT Application No. PCT/US2014/055205 dated May 28, 2015.
Chinese Office Action issued in connection with Related CN Application No. 201380035082.7 dated Jun. 3, 2015.
Chinese Office Action issued in connection with Related CN Application No. 201480050321.0 dated Jul. 28, 2016.
Unofficial English Translation of Chinese Office Action issued in connection with corresponding CN Application No. 201210328349.9 dated Feb. 11, 2015.
Unofficial English Translation of Japanese Search Report issued in connection with related JP Application No. 2016542104 dated Feb. 22, 2017.
Unofficial English Translation of Japanese Office Action issued in connection with related JP Application No. 2016542104 dated Mar. 21, 2017.
U.S. Non-Final Office Action issued in connection with related U.S. Appl. No. 14/411,523 dated Mar. 22, 2017.
Unofficial English Translation of Japanese Office Action issued in connection with related JP Application No. 2015520254 dated Apr. 4, 2017.
U.S. Final Office Action issued in connection with related U.S. Appl. No. 14/411,523 dated Sep. 1, 2017.
Extended European Search Report and Opinion issued in connection with corresponding EP Application No. 12182828.9 dated Oct. 17, 2017.

* cited by examiner

TURBINE ROTOR BLADE ASSEMBLY AND METHOD OF ASSEMBLING SAME

STATEMENT REGARDING FEDERALLY SPONSORED RESEARCH & DEVELOPMENT

This invention was made with Government support under contract number N00421-05-C-0053 and contract number F33615-05-D-2352. The Government may have certain rights in this invention.

BACKGROUND OF THE INVENTION

The field of the invention relates generally to rotors of turbines in a gas turbine engine and, more particularly, to methods and apparatus for retaining a damper in turbine ceramic matrix composite (CMC) blades.

At least some known aircraft are driven by two or more gas turbine engines that include turbine sections that include a plurality of blades, sometimes referred to as "buckets", mounted to the periphery of a rotor wheel or disk in an angularly spaced relationship to each other. The turbine blades of typically plural rotor disk stages project into an axially flowing hot gas stream to convert the kinetic energy of this working fluid to rotational mechanical energy. To accommodate material growth and shrinkage due to variations in temperature and centrifugal forces, the blades are typically provided with roots having a "fir tree" configuration, which are captured in dovetail slots in the rotor disk periphery. Typically, turbine blades include a platform to which the root, or dovetail is coupled. Also, typically, turbine blades include an airfoil coupled to the platform.

During engine operation, vibrations are induced in the turbine blades, including side-to-side, i.e., circumferential movement of the turbine blade platforms that increase excitation stresses induced in the turbine blade shanks. If left unchecked, these vibrations can result in premature fatigue failures in the blades.

To dissipate the energy of these vibrations, and hence lower vibrational amplitude and associated stresses, it is common practice to dispose dampers between the blades and the disk or between adjacent blades in positions to act against surfaces of tangentially projecting blade platforms. When the turbine disk rotates, the dampers are pressed against the platform surfaces by centrifugal forces. As the blades vibrate, the damper and platform surfaces slide against each other to produce frictional forces effective in substantially absorbing and thus dissipating much of the vibrational energy.

Also, in at least some aircraft gas turbine engines, the blades are formed from a ceramic matrix composite (CMC), such as silicon carbide (SiC). Such CMC materials may operate with a higher temperature working fluid, thereby facilitating a greater rate of energy conversion than similarly-sized high-temperature metal alloy blades. Therefore, blades formed from CMCs are substituted for high-temperature metal alloy blades because of the CMC blades' increased operating temperatures. However, such CMC blades have a lower ductility and strain tolerance than the high-temperature metal alloy blades they replace and known damper apparatus may not be suitable for damping the vibrations induced within the CMC blades.

BRIEF DESCRIPTION OF THE INVENTION

In one embodiment, a rotor blade assembly for a rotor of a gas turbine engine having an axis of rotation is provided. The rotor blade assembly includes a shank portion formed from a ceramic matrix composite (CMC) material. The rotor blade assembly also includes a platform portion formed from a substantially similar CMC material as that of the shank portion. The platform portion is coupled to the shank portion. The platform portion and the shank portion cooperate to at least partially define two opposing side portions of the rotor blade assembly. The opposing side portions are angularly separated with respect to the axis of rotation. The rotor blade assembly further includes a damper retention apparatus. At least a portion of the damper retention apparatus is coupled to the shank portion. The damper retention apparatus includes at least one angled bracket apparatus extending toward a circumferentially adjacent rotor blade assembly.

In another embodiment, a rotor assembly for a gas turbine engine having an axis of rotation is provide. The rotor assembly includes a rotor disk defining a periphery thereon and a plurality of rotor blades coupled to the periphery of the rotor disk. The plurality of rotor blades are positioned substantially circumferentially adjacent to each other in an angularly spaced relationship with respect to the axis of rotation. Each of the rotor blades includes a shank portion formed from a ceramic matrix composite (CMC) material. Each of the rotor blades also includes a platform portion formed from a substantially similar CMC material as that of the shank portion. The platform portion is coupled to the shank portion. The platform portion and the shank portion cooperate to at least partially define two opposing side portions of each of the rotor blades. The opposing side portions are angularly separated with respect to the axis of rotation. Each of the rotor blades further includes a damper retention apparatus. At least a portion of the damper retention apparatus is coupled to the shank portion. The damper retention apparatus includes at least one angled bracket apparatus extending toward the circumferentially adjacent rotor blade.

In yet another embodiment, a method of assembling a rotor blade assembly is provided. The method includes forming a shank portion from a ceramic matrix composite (CMC) material. The method also includes forming a platform portion from a substantially similar CMC material as that of the shank portion. The method further includes coupling the platform portion to the shank portion. The platform portion and the shank portion cooperate to at least partially define two opposing side portions of the rotor blade assembly. The opposing side portions are angularly separated with respect to an axis of rotation of a rotor of a gas turbine engine. The method also includes forming a damper retention apparatus that includes forming at least one angled bracket apparatus, coupling the at least one angled bracket apparatus to the shank portion, and circumferentially extending the at least one angled bracket apparatus away from the shank portion.

BRIEF DESCRIPTION OF THE DRAWINGS

FIG. 1 is a schematic cross-sectional view of an aircraft gas turbine engine in accordance with an exemplary embodiment of the present invention;

FIG. 2 is an exploded perspective schematic view of an exemplary ceramic matrix composite (CMC) turbine blade assembly that may be used with the aircraft gas turbine engine shown in FIG. 1;

FIG. 3 is a perspective view of the CMC turbine blade assembly shown in FIG. 2 fully assembled;

FIG. 4 is a perspective view of two opposing sides of the CMC turbine blade assembly shown in FIG. 3 with an exemplary L-bracket retaining apparatus and without a sheet metal damper;

FIG. 5 is a perspective view of two opposing sides of the CMC turbine blade assembly shown in FIG. 3 with the L-bracket retaining apparatus shown in FIG. 4 with an exemplary sheet metal damper installed;

FIG. 6 is a cutaway schematic side view of the CMC turbine blade assembly shown in FIG. 3 with an exemplary machined pocket defined therein;

FIG. 7 is an axial view of two adjacent CMC turbine blade assemblies shown in FIG. 3 and the L-bracket retaining apparatus and the sheet metal damper shown in FIG. 5;

FIG. 8 is a cutaway side view of the CMC turbine blade assembly shown in FIG. 3 with the L-bracket retaining apparatus and the sheet metal damper taken along line 8-8 shown in FIG. 7;

FIG. 9 is an axial view of two adjacent CMC turbine blade assemblies shown in FIG. 3 with two opposing L-bracket retaining apparatus and a sheet metal damper similar to those shown in FIG. 7;

FIG. 10 is a cutaway side view of the CMC turbine blade assembly shown in FIG. 3 and the sheet metal damper shown in FIG. 5 and an exemplary alternative retaining apparatus that may be used with the aircraft gas turbine engine shown in FIG. 1;

FIG. 11 is a cutaway side view of the CMC turbine blade assembly shown in FIG. 3 and the sheet metal damper shown in FIG. 5 and another exemplary alternative L-bracket retaining apparatus that may be used with the aircraft gas turbine engine shown in FIG. 1;

FIG. 12 is a cutaway side view of the CMC turbine blade assembly shown in FIG. 3 and an exemplary ring damper that may be used with the aircraft gas turbine engine shown in FIG. 1;

FIG. 13 is an axial view of one of the CMC turbine blade assemblies shown in FIG. 3 and an exemplary alternative ring damper that may be used with the aircraft gas turbine engine shown in FIG. 1;

FIG. 14 is a cutaway side view of the CMC turbine blade assembly shown in FIG. 3 and the sheet metal damper shown in FIG. 5 and an exemplary ring retaining apparatus that may be used with the aircraft gas turbine engine shown in FIG. 1;

FIG. 15 is an axial view of two adjacent CMC turbine blade assemblies shown in FIG. 3 and an exemplary alternative damper with an exemplary alternative damper retaining apparatus coupled to and extending from an exemplary rotor disk that may be used with the aircraft gas turbine engine shown in FIG. 1;

FIG. 16 is an axial view of two adjacent CMC turbine blade assemblies shown in FIG. 3 and the damper shown in FIG. 15 with another alternative damper retaining apparatus coupled to and extending from adjacent blade shanks that may be used with the aircraft gas turbine engine shown in FIG. 1;

FIG. 17 is an axial view of two adjacent CMC turbine blade assemblies shown in FIG. 3 and the damper shown in FIG. 15 with another alternative damper retaining apparatus coupled to and extending from adjacent blade shanks that may be used with the aircraft gas turbine engine shown in FIG. 1;

FIG. 18 is an axial view of two adjacent CMC turbine blade assemblies shown in FIG. 3 and an exemplary combined alternative damper and retaining apparatus coupled to and extending from an exemplary rotor disk that may be used with the aircraft gas turbine engine shown in FIG. 1;

FIG. 19 is an axial view of two adjacent CMC turbine blade assemblies shown in FIG. 3 and the sheet metal damper shown in FIG. 5 with another alternative damper retaining apparatus coupled to and extending from an exemplary rotor disk that may be used with the aircraft gas turbine engine shown in FIG. 1;

FIG. 20 is an axial view of two adjacent CMC turbine blade assemblies shown in FIG. 3 and the sheet metal damper shown in FIG. 5 with another alternative damper retaining apparatus coupled to and extending from an exemplary rotor disk that may be used with the aircraft gas turbine engine shown in FIG. 1;

FIG. 21 is a cutaway side view of one of the CMC turbine blade assemblies and the sheet metal damper with the alternative damper retaining apparatus taken along line 21-21 shown in FIG. 20;

FIG. 22 is a cutaway side view of the CMC turbine blade assembly shown in FIG. 3 and an exemplary combined damper and slotted retaining apparatus that may be used with the aircraft gas turbine engine shown in FIG. 1;

FIG. 23 is a cutaway side view of the CMC turbine blade assembly shown in FIG. 3 and an exemplary combined damper and clipped retaining apparatus that may be used with the aircraft gas turbine engine shown in FIG. 1;

FIG. 24 is a cutaway side view of the CMC turbine blade assembly shown in FIG. 3 and the sheet metal damper shown in FIG. 5 and an exemplary pinned damper retaining apparatus that may be used with the aircraft turbine engine shown in FIG. 1;

FIG. 25 is a cutaway side view of the CMC turbine blade assembly shown in FIG. 3 and an exemplary alternative damper and an exemplary alternative pinned damper retaining apparatus that may be used with the aircraft turbine engine shown in FIG. 1;

FIG. 26 is an axial view of two adjacent CMC turbine blade assemblies shown in FIG. 3 and the sheet metal damper shown in FIG. 5 and an alternative exemplary pinned damper retaining apparatus that may be used with the aircraft turbine engine shown in FIG. 1;

FIG. 27 is a cutaway side view of one of the CMC turbine blade assemblies and the sheet metal damper and the alternative pinned damper retaining apparatus taken along line 27-27 shown in FIG. 26;

FIG. 28 is a cutaway side view of the CMC turbine blade assembly shown in FIG. 3 and the sheet metal damper shown in FIG. 5 with two axially opposing L-bracket retaining apparatus similar to that shown in FIG. 10;

FIG. 29 is a cutaway side view of the CMC turbine blade assembly shown in FIG. 3 and the sheet metal damper shown in FIG. 5 with an L-bracket retaining apparatus similar to that shown in FIG. 10 and a pinned damper retaining apparatus similar to that shown in FIGS. 26 and 27;

FIG. 30 is a cutaway side view of the CMC turbine blade assembly shown in FIG. 3 and a combined damper and clipped retaining apparatus similar to that shown in FIG. 23 with an L-bracket retaining apparatus similar to that shown in FIG. 10;

FIG. 31 is a cutaway side view of the CMC turbine blade assembly shown in FIG. 3 and a combined damper and slotted retaining apparatus similar to that shown in FIG. 22 with an L-bracket retaining apparatus similar to that shown in FIG. 10;

FIG. 32 is a perspective view of two sides of an alternative exemplary CMC turbine blade assembly shown with an exemplary triangular bar damper retaining apparatus and without a triangular bar damper;

FIG. 33 is a perspective view of two sides of the alternative CMC turbine blade assembly with the triangular bar damper retaining apparatus shown in FIG. 32 with an exemplary triangular bar damper installed;

FIG. 34 is a cutaway schematic side view of the CMC turbine blade assembly shown in FIG. 3 with the triangular bar damper retaining apparatus shown in FIGS. 32 and 33 with a machined triangular pocket 604 defined therein; and FIG. 35 is a flowchart of an exemplary method of assembling the turbine rotor blade assemblies described herein.

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, apparatus for damping vibrations induced in ceramic matrix composite (CMC) aircraft turbine blades and methods of assembling the same. However, it is contemplated that this disclosure has general application to turbine, fan, and compressor blade architectures in other industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. Moreover, as used herein, the terms "turbine rotor blade assembly", "turbine blade assembly", "rotor blade assembly", "turbine blade", and "rotor blade" are used interchangeably.

Embodiments of the present invention provide novel turbine blade dampening apparatus for CMC aircraft turbine blades. Such blade dampening apparatus reduces vibration in the turbine blades, thereby reducing excitation stresses, increasing the strain tolerance of the blade shanks, and increasing a capability to handle wakes from other components in the engine. Various embodiments of the blade dampening apparatus described herein may be coupled to the blade shank, blade platform, forward and/or aft angel wings, and the rotor disk. Also, the blade dampening apparatus may be oriented and configured as necessary to facilitate vibration dampening on a variety of blade designs and types. Furthermore, the embodiments described herein may be used independently and exclusively, as well as conjunctively and interchangeably. Therefore, existing aircraft gas turbines may be retrofitted with the blade dampening apparatus described herein. Moreover, the blade dampening apparatus may receive a coating, including, without limitation, friction coatings, wear coatings, recession coatings (e.g., environmental barrier coatings), and thermal barrier coatings. Also, the various embodiments described herein are configured and oriented within the turbine such that they will remain in place when the turbine rotor is slowed or stopped.

Figure 1:
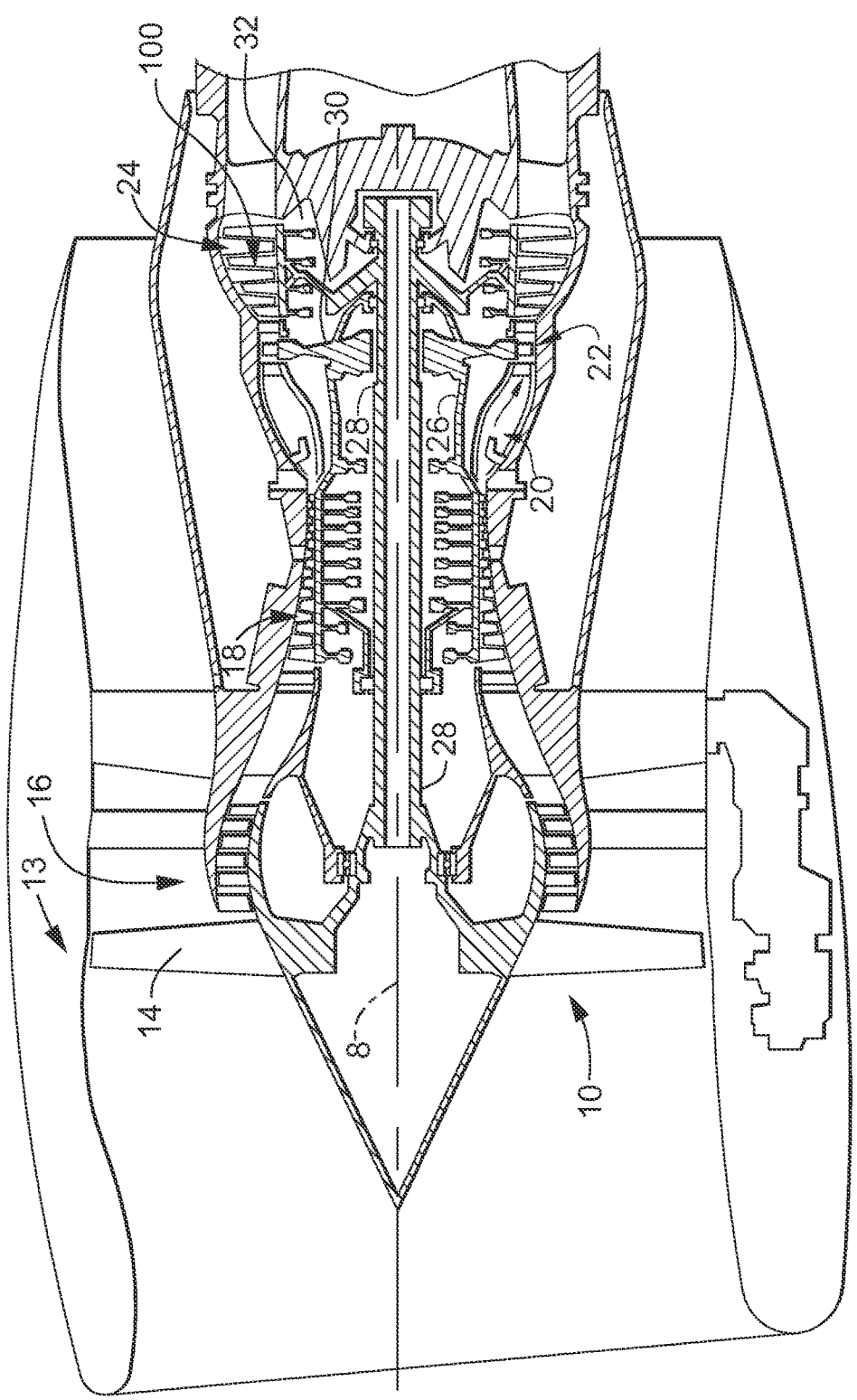
FIGS. 1 through 35 show exemplary embodiments of the method and system described herein.

FIG. 1 is a schematic cross-sectional diagram of an exemplary embodiment of an aircraft gas turbine engine 10 having an engine axis, i.e., axis of rotation 8, such as a GE CFM56 series engine. Engine 10 includes, in downstream serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26 drivingly connects HPT 22 to HPC 18 and a low pressure shaft 28 drivingly connects LPT 24 to LPC 16 and fan 14. HPT 22 includes an HPT rotor 30 having ceramic matrix composite (CMC) turbine blades assemblies 100 mounted at a periphery of rotor 30, i.e., a rotor wheel disk 32. CMCs include materials such as silicon carbide (SiC). LPT 24 may also include CMC turbine rotor blade assemblies 100.

Figure 2:
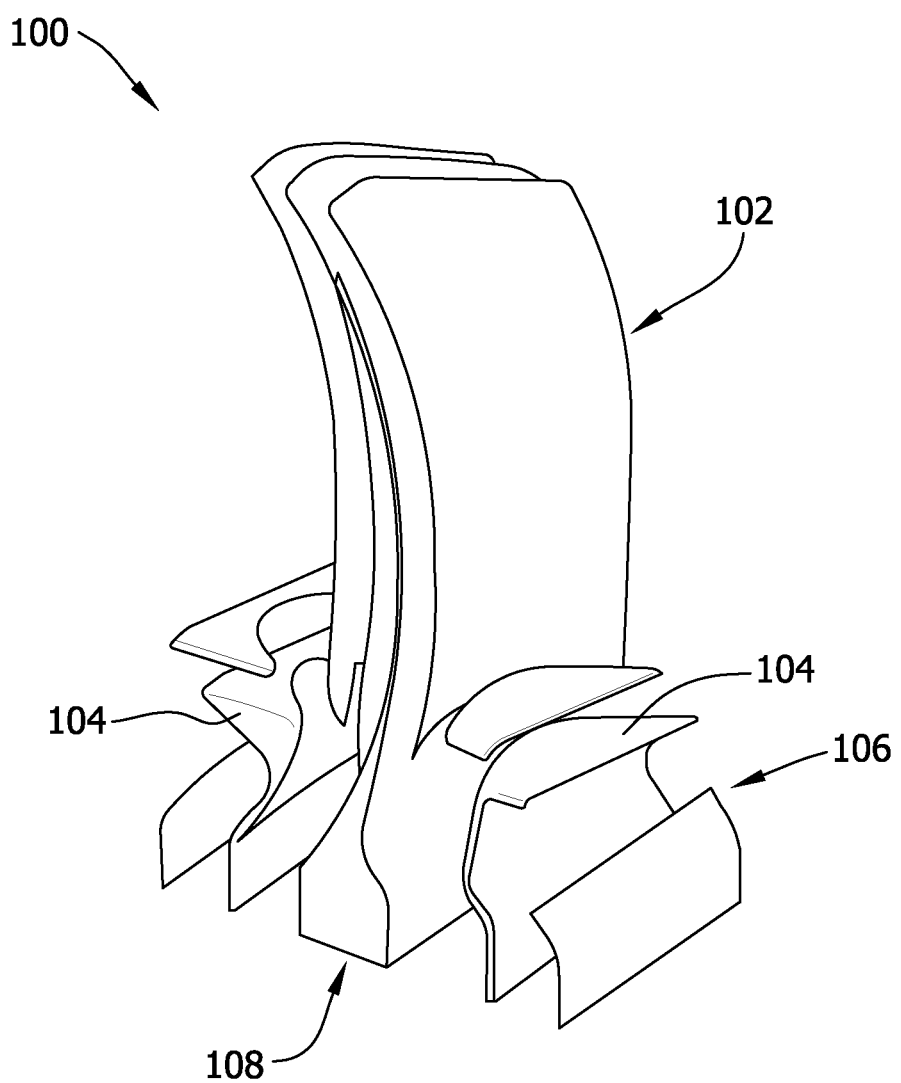
Figure 3:
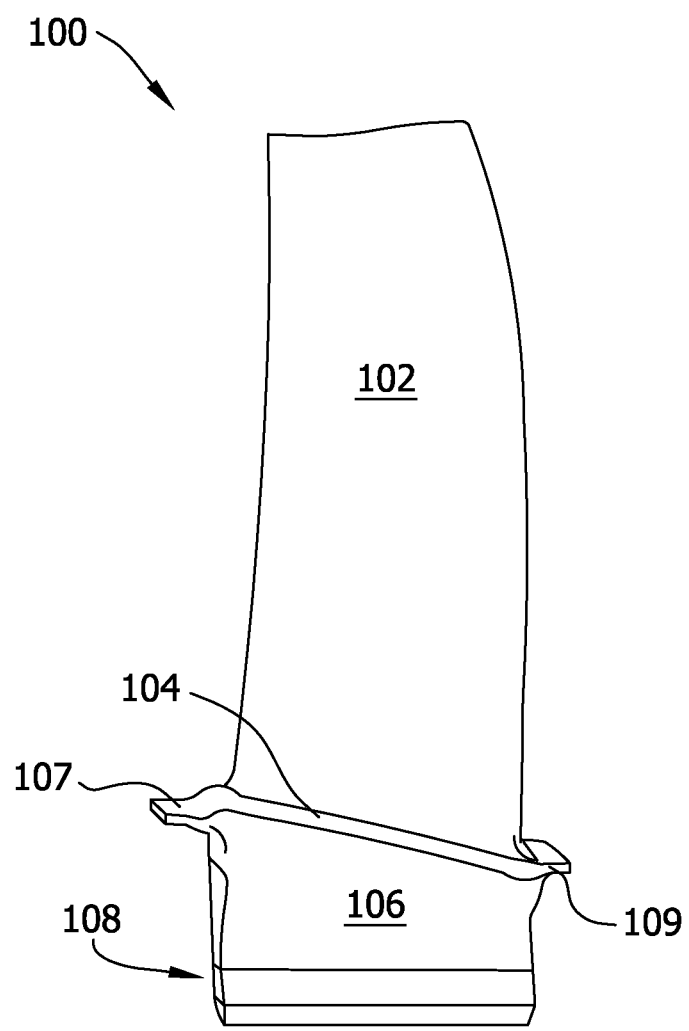

FIG. 2 is an exploded perspective schematic view of an exemplary ceramic matrix composite (CMC) turbine blade assembly 100 that may be used with aircraft gas turbine engine 10 (shown in FIG. 1). FIG. 3 is a perspective view of CMC turbine blade assembly 100 fully assembled. CMC turbine blade assembly 100 includes an airfoil portion 102, a platform portion 104, and a shank portion 106 with a dovetail attachment mechanism 108. Blade assembly 100 also includes an axially upstream, or forward angel wing 107 and an axially downstream, or aft angel wing 109. In the exemplary embodiment, CMC turbine blade assembly 100 is unitarily formed as a single component via those CMC fabrication processes known in the art. FIG. 2 shows CMC turbine blade assembly 100 as a plurality of CMC plies.

Figure 4:
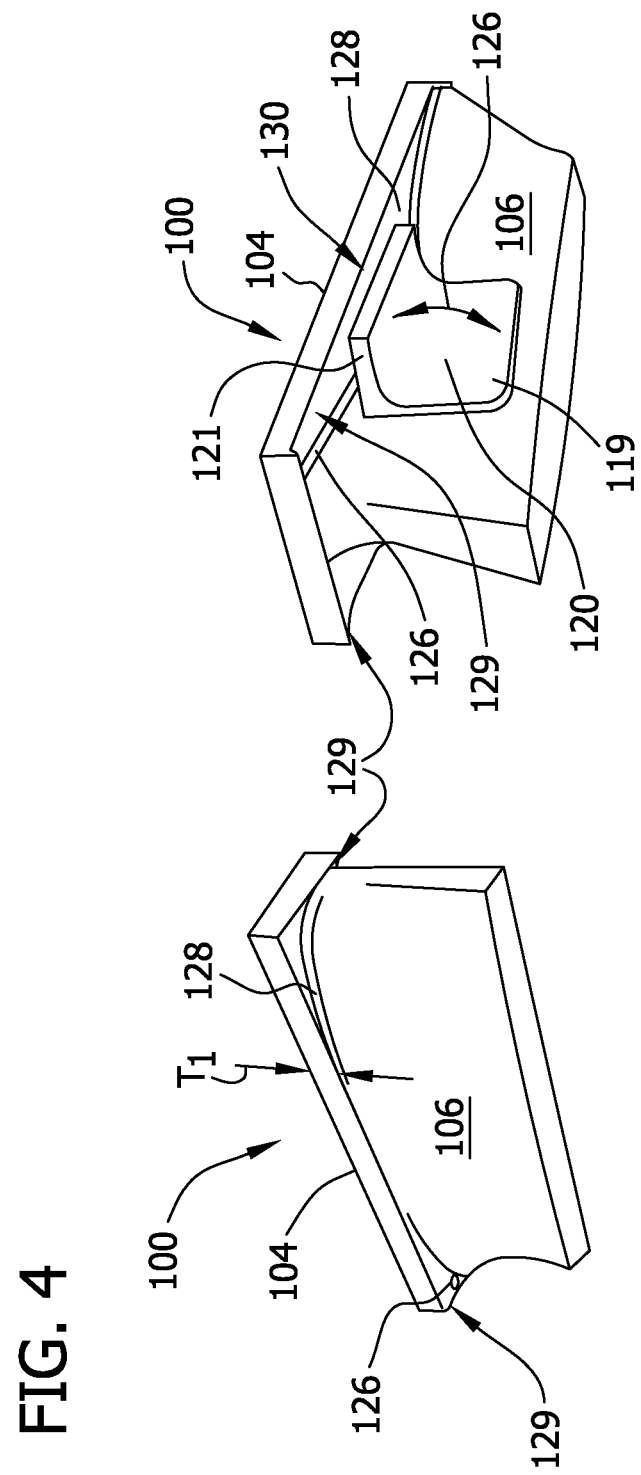
Figure 5:
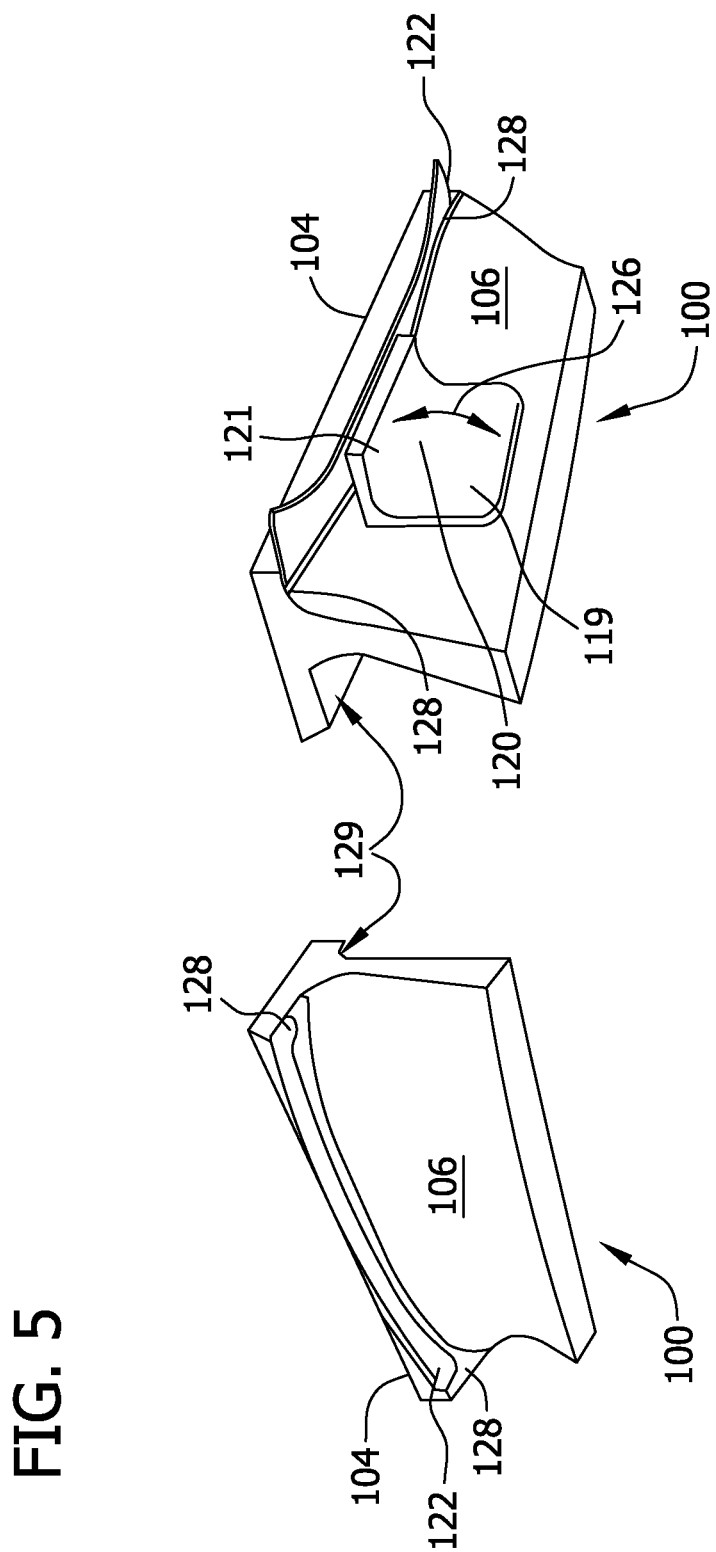
Figure 6:
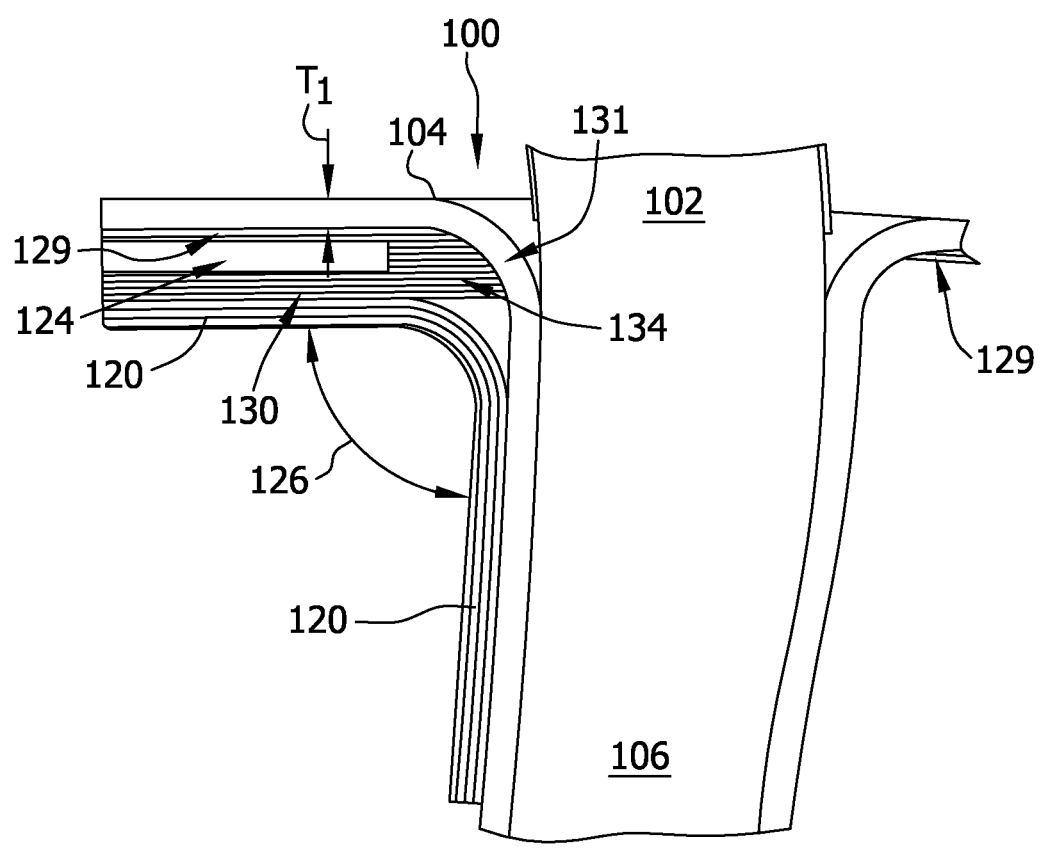

FIG. 4 is a perspective view of two opposing sides of CMC turbine blade assembly 100 with an exemplary angled, or L-bracket retaining apparatus 120. FIG. 5 is a perspective view of two opposing sides of CMC turbine blade assembly 100 with L-bracket retaining apparatus 120 and an exemplary sheet metal damper 122 installed. FIG. 6 is a cutaway schematic side view of CMC turbine blade assembly 100 with a machined pocket 124 defined therein. L-bracket retaining apparatus 120 is formed from a CMC material that is similar to and/or compatible with the CMC material of turbine blade assembly 100. Moreover, L-bracket retaining apparatus 120 includes a first portion 119 and a second portion 121 that define an angle 126 that is approximately, or slightly less than, 90°. Alternatively, apparatus 120 defines any angle 126 that enables operation of apparatus 120 as described herein. In the exemplary embodiment, platform portion 104 has a radial thickness $T_1$ and is referred to a "thin platform configuration." Alternatively, platform portion 104 has any radial thickness that enables operation of blade assembly 100 as described herein.

In some embodiments, as shown in FIGS. 4 and 5, second portion 121 of L-bracket retaining apparatus 120 cooperates with one of two shank, i.e., blade side walls 128 and a portion of underside 129 of platform 104 to define a platform gap 130. Platform gap 130 is sized to receive and retain sheet metal damper 122 via an interference fit, i.e., without coupling methods such as welding, brazing, and fastener hardware. Moreover, in some embodiments, L-bracket retaining apparatus 120 extends from a shank portion 106 of a first blade 100 to a shank portion 106 of an adjacent blade 100, wherein L-bracket retaining apparatus 120 is maintained in position via an interference fit. Alternatively, in some embodiments, L-bracket retaining apparatus 120 does not fully extend between blades 100 and first portion 119 is coupled to an associated shank 106 by any method that enables operation of L-bracket retaining apparatus 120 and CMC turbine blade assembly 100 as described herein, including, without limitation, unitarily forming CMC turbine blade assembly 100 with L-bracket retaining apparatus 120.

Also, alternatively, as shown in FIG. 6, some embodiments include machined pocket 124 formed within a CMC insert 134. An interface 131 (only shown in FIG. 6) is defined between shank side wall 128 and a portion of underside 129. In this exemplary alternative embodiment, CMC insert 134 is coupled to a portion of underside 129, L-bracket retaining apparatus 120, and a portion of shank side wall 128 at interface 131 via an interference fit, i.e., without coupling methods such as welding, brazing, and fastener hardware.

Figure 7:
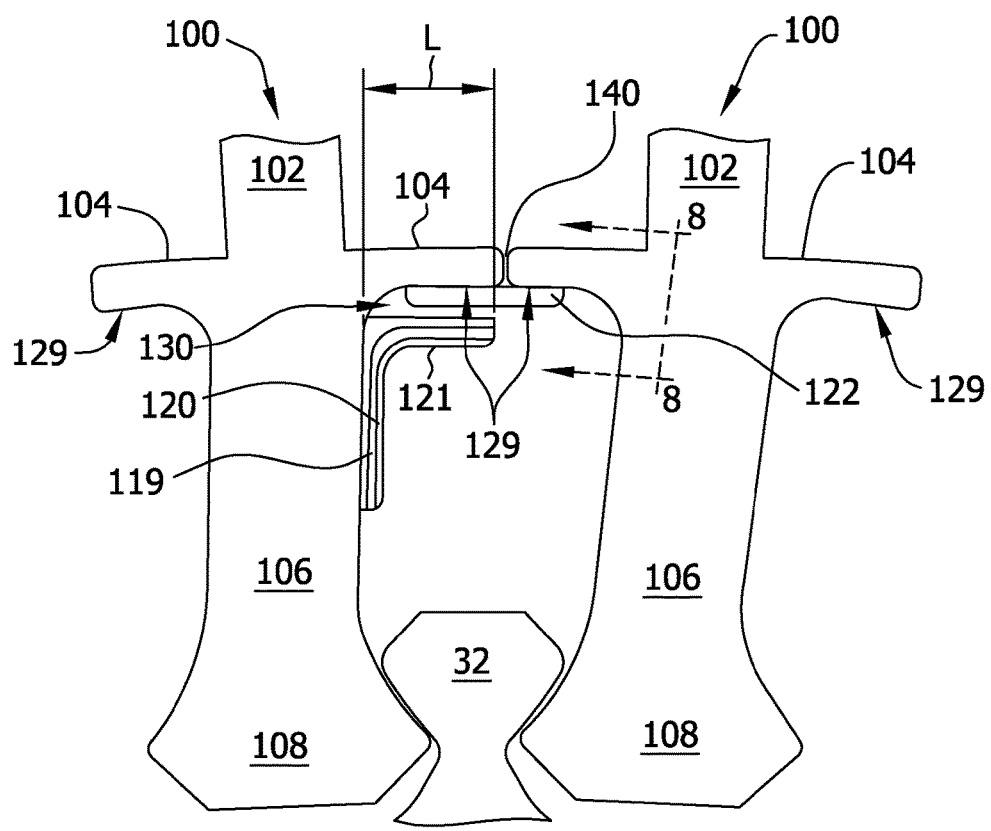

FIG. 7 is an axial view of two adjacent CMC turbine blade assemblies 100 and L-bracket retaining apparatus 120 and sheet metal damper 122. Each of adjacent CMC turbine blade assemblies 100 are shown in FIG. 7 as coupled to rotor wheel disk 32. Also, adjacent CMC turbine blade assemblies 100 define an interface 140 of blade platforms 104. As shown in FIG. 7, sheet metal damper 122 is coupled to underside 129 of blade platforms 104 and may, or may not, be centered with respect to interface 140. Moreover, in this exemplary embodiment, second portion 121 of L-bracket retaining apparatus 120 extends a length L, i.e., it does not fully extend between adjacent blade assemblies 100, and first portion 119 is coupled to an associated shank 106 by any method that enables operation of L-bracket retaining apparatus 120, sheet metal damper 122, and CMC turbine blade assembly 100 as described herein, including, without limitation, unitarily forming CMC turbine blade assembly 100 with L-bracket retaining apparatus 120.

While FIG. 7 shows L-bracket retaining apparatus 120 and sheet metal damper 122 not touching for clarity, L-bracket retaining apparatus 120 is positioned substantially stationary against shank 106, at least partially extending toward shank 106 of adjacent blade assembly 100 length L. Moreover, L-bracket retaining apparatus 120 is extended sufficiently toward adjacent blade assembly 100 length L to facilitate coupling to sheet metal damper 122 via an interference fit. Such interference fit facilitates sheet metal damper 122 being maintained in position regardless of operation of gas turbine engine 10 (shown in FIG. 1), such operation including, without limitation, substantially stationary rotor 30 (shown in FIG. 1) conditions, slow rotation of rotor 30 via turning gear (not shown), accelerations to predetermined operating speeds, and subsequent decelerations.

Figure 8:
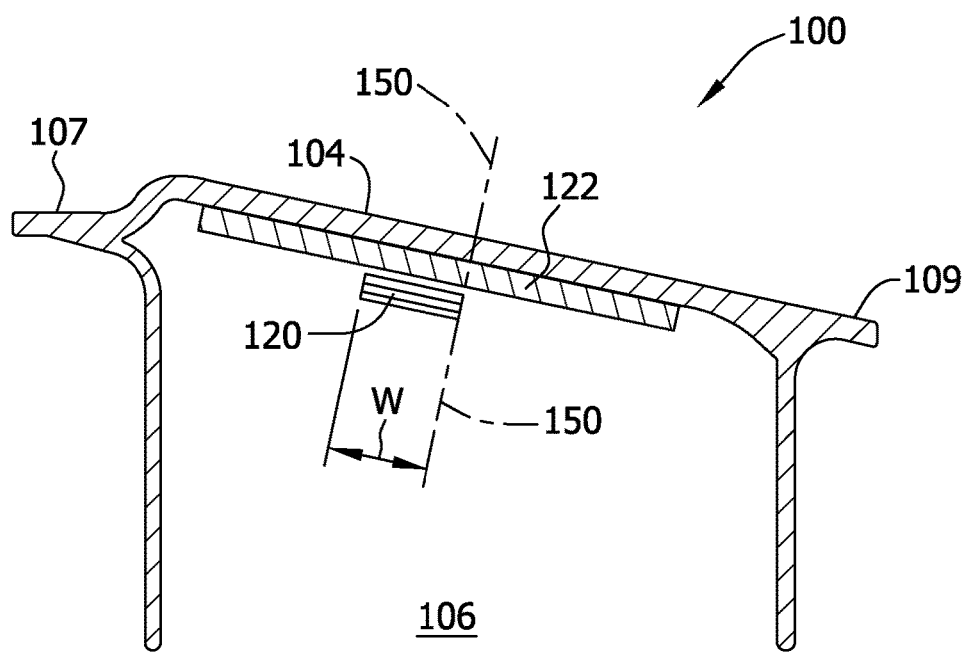

FIG. 8 is a cutaway side view of CMC turbine blade assembly 100 with L-bracket retaining apparatus 120 and sheet metal damper 122 taken along line 8-8 (shown in FIG. 7). Platform 104 defines a platform centerline 150 that is substantially equidistant between forward angle wing 107 and aft angle wing 109, and is substantially orthogonal to platform 104. As shown in FIG. 7, L-bracket retaining apparatus 120 has a width W that extends forward from platform centerline 150. Alternatively, L-bracket retaining apparatus 120 has any width W and is positioned anywhere between forward angle wing 107 and aft angle wing 109 that enables operation of L-bracket retaining apparatus 120, sheet metal damper 122, and blade assembly 100 as described herein.

Figure 9:
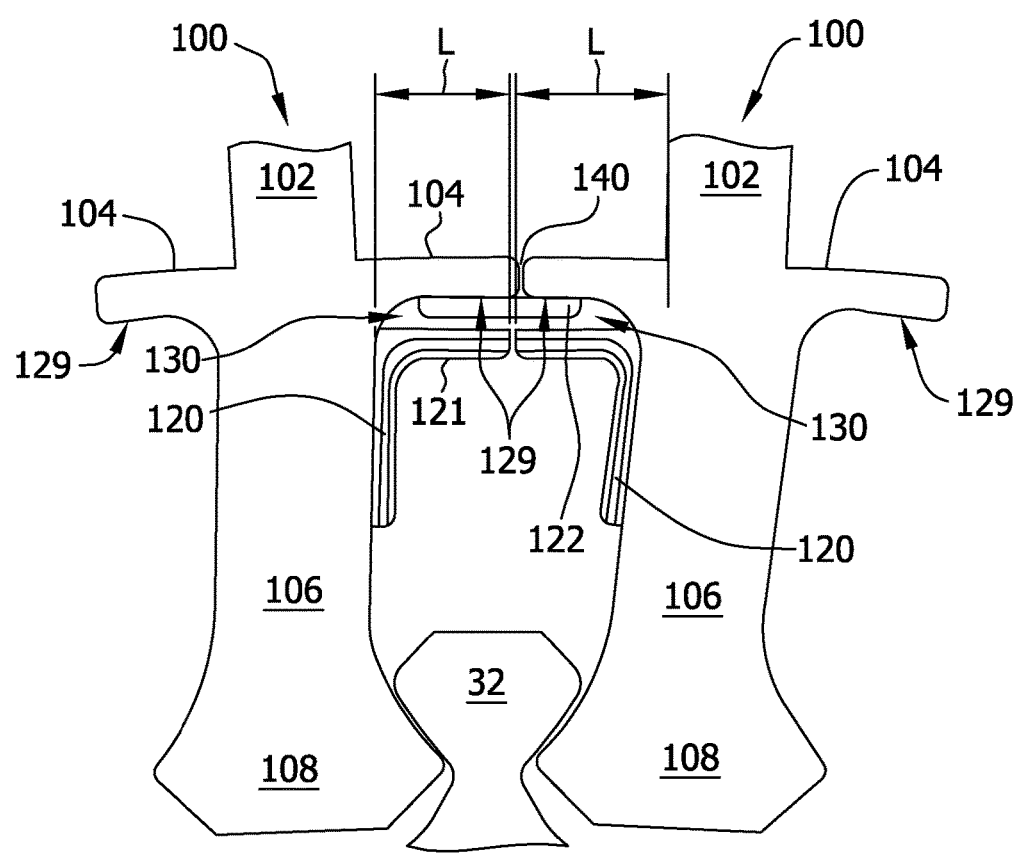

FIG. 9 is an axial view of two adjacent CMC turbine blade assemblies 100 with two opposing L-bracket retaining apparatus 120 and sheet metal damper 122. Each of adjacent CMC turbine blade assemblies 100 are shown in FIG. 9 as coupled to rotor wheel disk 32. Also, adjacent CMC turbine blade assemblies 100 define interface 140 of blade platforms 104. As shown in FIG. 9, sheet metal damper 122 is coupled to underside 129 of blade platforms 104 and may, or may not, be centered with respect to interface 140. Moreover, in this exemplary embodiment, each L-bracket retaining apparatus 120 extends length L, i.e., neither apparatus 120 extends fully between adjacent blade assemblies 100, and apparatus 120 is coupled to associated shank 106 by any method that enables operation of L-bracket retaining apparatus 120, sheet metal damper 122, and CMC turbine blade assembly 100 as described herein, including, without limitation, unitarily forming each CMC turbine blade assembly 100 with each associated L-bracket retaining apparatus 120.

While FIG. 9 shows both L-bracket retaining apparatus 120 and sheet metal damper 122 not touching for clarity, each L-bracket retaining apparatus 120 is positioned substantially stationary against associated shank 106, at least partially extending toward shank 106 of the adjacent blade assembly 100 with length L. Moreover, each L-bracket retaining apparatus 120 is extended sufficiently toward adjacent blade assembly 100 with length L to facilitate coupling to sheet metal damper 122 via an interference fit. Such interference fit facilitates sheet metal damper 122 being maintained in position regardless of operation of gas turbine engine 10 (shown in FIG. 1), such operation including, without limitation, substantially stationary rotor 30 (shown in FIG. 1) conditions, slow rotation of rotor 30 via turning gear (not shown), accelerations to predetermined operating speeds, and subsequent decelerations.

In the exemplary embodiment, adjacent L-bracket retaining apparatus 120 do not contact each other. Alternatively, some embodiments of rotor 30 may include adjacent L-bracket retaining apparatus 120 in contact with each other. Also, some embodiments of rotor 30 may include adjacent L-bracket retaining apparatus 120 axially positioned such that one apparatus 120 is closest to forward angle wing 107 and one apparatus 120 is closest to aft angle wing 109.

Figure 10:
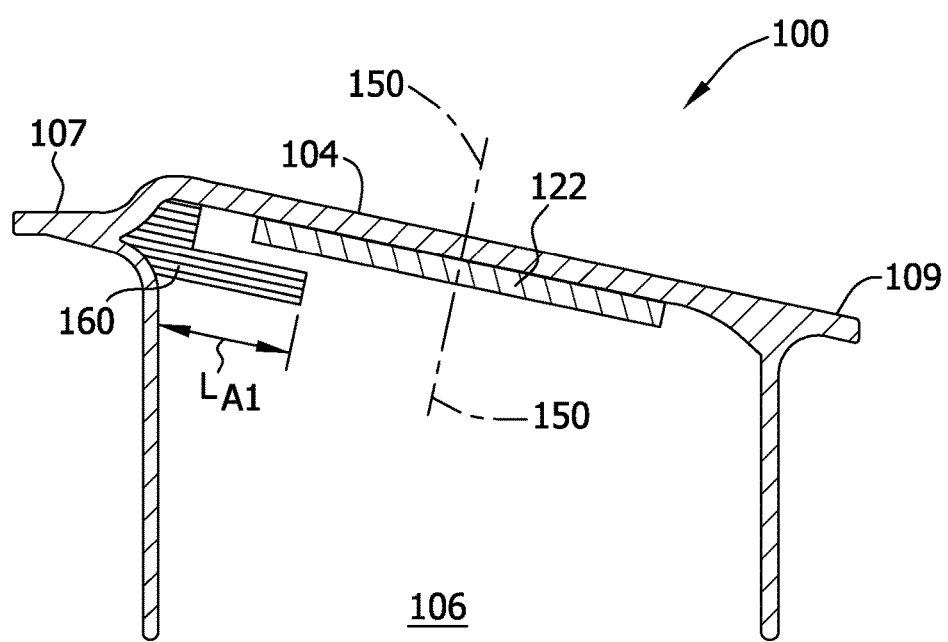
Figure 11:
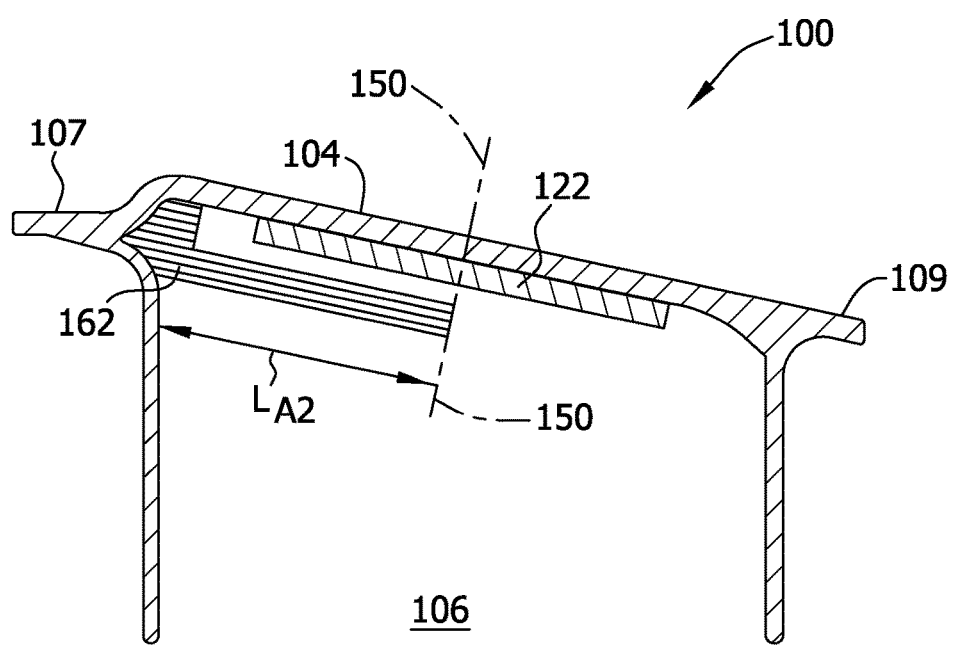

FIG. 10 is a cutaway side view of CMC turbine blade assembly 100 and sheet metal damper 122 and an exemplary alternative retaining apparatus 160 that may be used with aircraft gas turbine engine 10 (shown in FIG. 1). FIG. 11 is a cutaway side view of CMC turbine blade assembly 100 and sheet metal damper 122 and another exemplary alternative retaining apparatus 162 that may be used with aircraft gas turbine engine 10 (shown in FIG. 1). FIG. 10 shows retaining apparatus 160 with an axial length $L_{A1}$ extending from forward angle wing 107 to point short of platform centerline 150. FIG. 11 shows retaining apparatus 162 with an axial length $L_{A2}$ extending from forward angle wing 107 to approximately platform centerline 150. Alternatively, retaining apparatus 160 and 162 have any axial lengths $L_A$ that enable operation of retaining apparatus 160 and 162, sheet metal damper 122, and CMC turbine blade assembly 100 as described herein. Moreover, alternatively, retaining apparatus 160 and 162 may have any orientation and configuration that enables operation of retaining apparatus 160 and 162, sheet metal damper 122, and CMC turbine blade assembly 100 as described herein, including, without limitation, extending from a top surface of platform 104 to an underside of damper 122 and extending forward from aft angel wing 109. In addition, in the exemplary embodiment, retaining apparatus 160 and 162 are formed from CMC material. Alternatively, retaining apparatus 160 and 162 may be formed from any material that enables operation of retaining apparatus 160 and 162, sheet metal damper 122, and CMC turbine blade assembly 100 as described herein.

Figure 12:
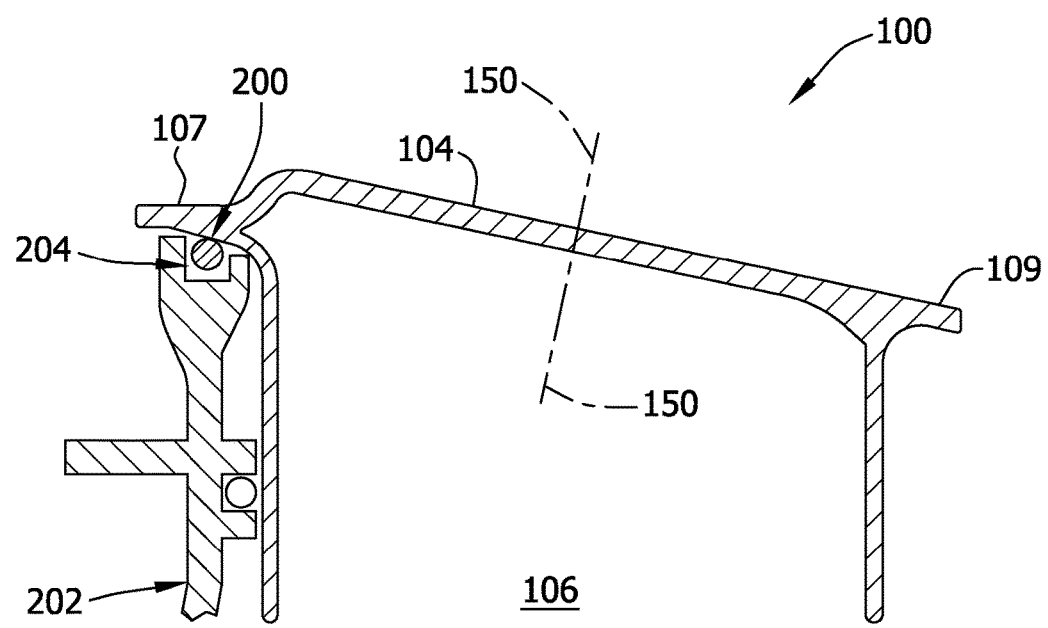

FIG. 12 is a cutaway side view of CMC turbine blade assembly 100 and an exemplary ring damper 200 that may be used with aircraft gas turbine engine 10 (shown in FIG. 1). In the exemplary embodiment, a cooling plate 202 is coupled to the forward end of blade assembly 100 just below forward angel wing 107. Also, in the exemplary embodiment, exemplary ring damper 200 is threaded through a circumferential cavity 204 defined between a plurality of forward angel wings 107 and a plurality of cooling plates 202, wherein wings 107 and plates 202 extend circumferentially about rotor 30 (shown in FIG. 1). Therefore, ring damper 200 may extend substantially continuously and substantially circumferentially for 360°. Alternatively, ring damper 200 may extend circumferentially for 360° in segments. Ring damper 200 facilitates dampening vibratory movement between the plurality of forward angel wings 107 and the plurality of cooling plates 202.

Figure 13:
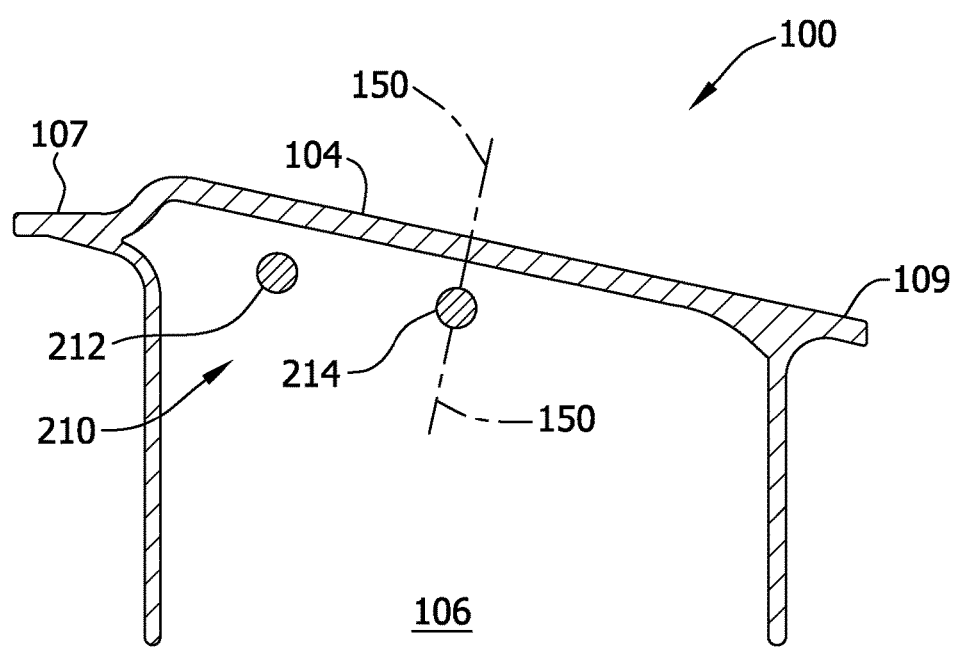

FIG. 13 is an axial view of one of CMC turbine blade assemblies 100 and an exemplary alternative ring damper 210 that may be used with aircraft gas turbine engine 10 (shown in FIG. 1). In the exemplary embodiment, ring damper 210 includes two rings, i.e., ring 212 and ring 214. Alternatively, ring damper 210 may include any number of rings 212/214 that enable operation of ring damper 210 as described herein. Rings 212 and 214 may extend substantially continuously and substantially circumferentially for 360° through an entire axial row (not shown) of blade assemblies 100. Alternatively, rings 212 and 214 may extend circumferentially for 360° through an entire axial row of blade assemblies 100 in segments. Ring damper 210 facilitates dampening vibratory movement between platform 104 and shank 106. While FIG. 13 shows alternative ring damper 210 and platform 104 not touching for clarity, each of rings 212 and 214 is extended with sufficient tension to facilitate coupling rings 212 and 214 to platform 104 via an interference fit.

Figure 14:
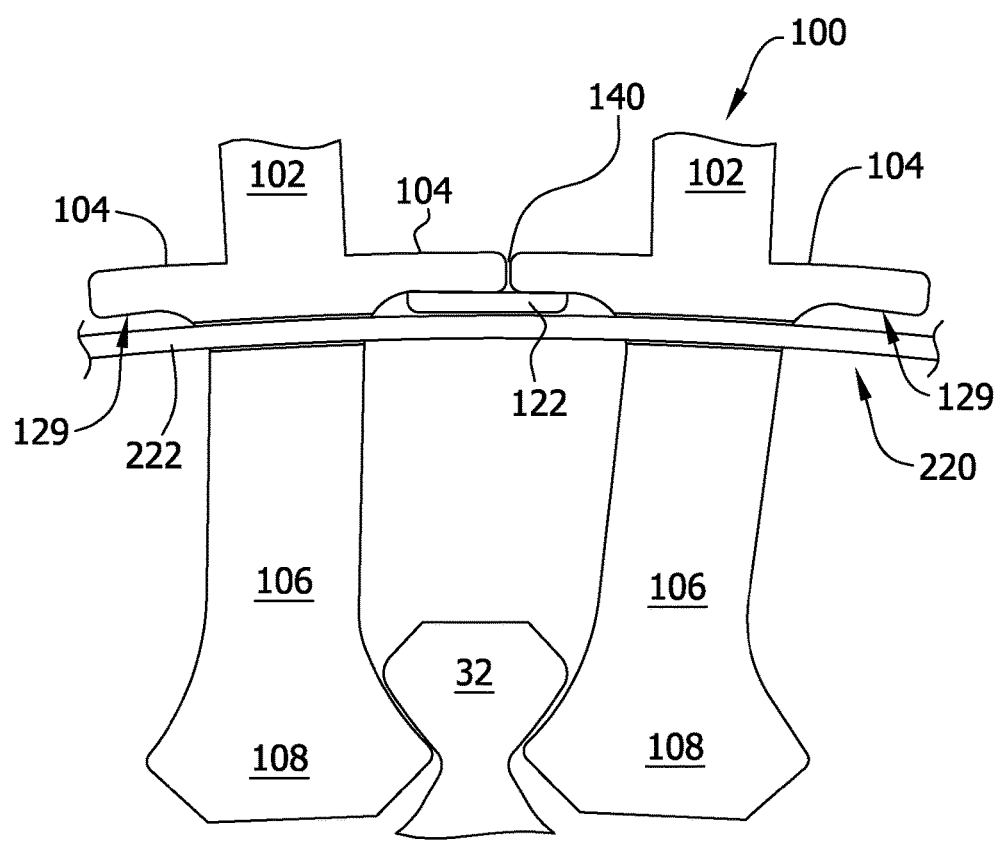

FIG. 14 is an axial view of two adjacent CMC turbine blade assemblies 100 and sheet metal damper 122 and an exemplary ring retaining apparatus 220 that may be used with aircraft gas turbine engine 10 (shown in FIG. 1). Ring retaining apparatus 220 may extend substantially continuously and substantially circumferentially for 360° through an entire axial row (not shown) of blade assemblies 100. Alternatively, ring retaining apparatus 220 may extend circumferentially for 360° through an entire axial row of blade assemblies 100 in segments. In the exemplary embodiment, ring retaining apparatus 220 includes one ring 222. Alternatively, ring retaining apparatus 220 may include any number of rings 222 that enable operation of ring retaining apparatus 220 as described herein.

While FIG. 14 shows both ring retaining apparatus 220 and sheet metal damper 122 not touching for clarity, each ring retaining apparatus 220 is extended with sufficient tension to facilitate coupling ring 222 to sheet metal damper 122 via an interference fit. Such interference fit facilitates sheet metal damper 122 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 15:
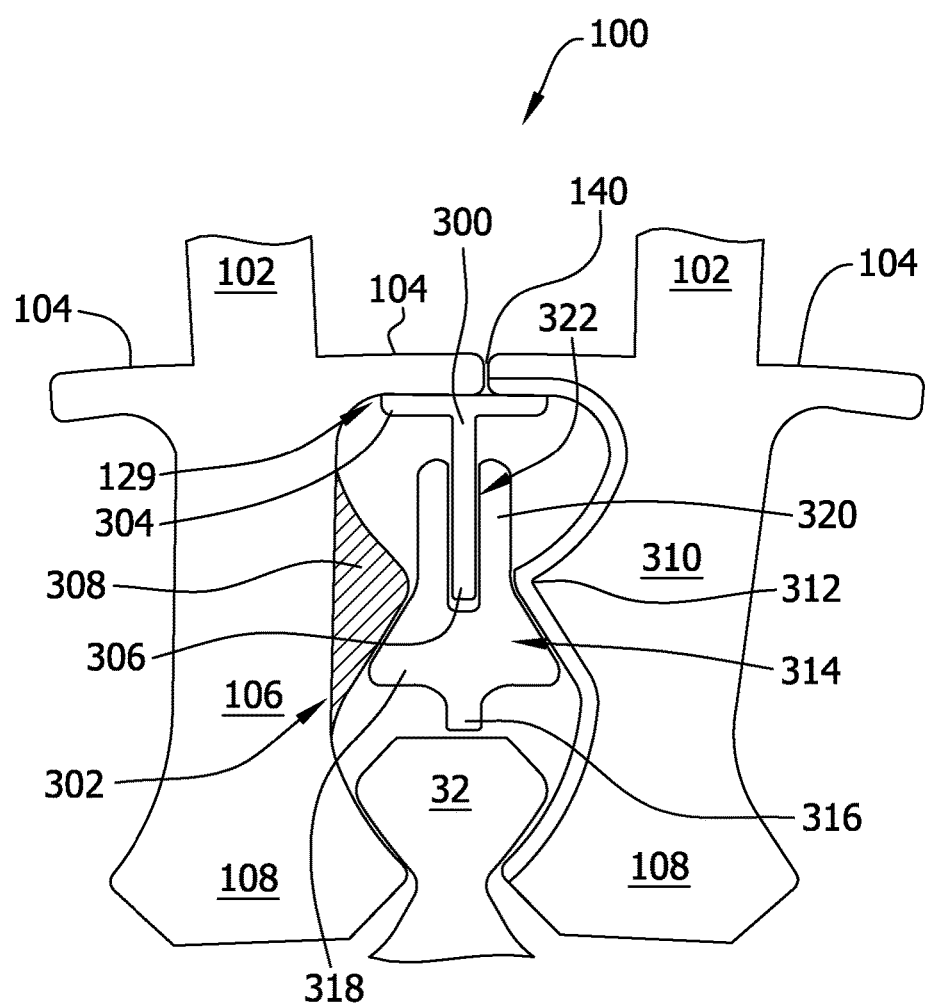

FIG. 15 is an axial view of two adjacent CMC turbine blade assemblies 100 and exemplary alternative damper 300 with an exemplary damper retaining apparatus 302 coupled to and extending from adjacent blade shanks 106 that may be used with aircraft gas turbine engine 10 (shown in FIG. 1). Alternative damper 300 is substantially T-shaped with a plate portion 304 and a radial extension 306 coupled to plate portion 304. In the exemplary embodiment, damper 300 is unitarily formed. Alternatively, damper 300 is assembled by coupling plate portion 304 and a radial extension 306 via any method that enables operation of damper retaining apparatus 302 as described herein. Also, damper 300 is formed from any material that enables operation of damper retaining apparatus 302 as described herein.

Damper retaining apparatus 302 includes at least one of a shank extension 308 and an alternative exemplary shank 310 with a unitary shank extension 312. Shank extension 308 is coupled to shank 106 via any method that enables operation of damper retaining apparatus 302 as described herein. Damper retaining apparatus 302 also includes a shaped coupler 314. Shaped coupler 314 includes a shaped body 316 that is complimentary to shank extension 308 and/or shank extension 312 and is coupled via an interference fit thereto. Shaped coupler 314 also includes a disk extension 318 coupled to shaped body 316 and radially extending therefrom coupled to rotor wheel disk 32 via an interference fit. Shaped coupler 314 further includes a damper extension 320 coupled to shaped body 316 and radially extending therefrom. Damper extension 320 defines a cavity 322 therein that is complimentary to radial extension 306 of damper 300, and receives extension 306 therein via an interference fit. In the exemplary embodiment, shaped coupler 314 is unitarily formed. Alternatively, shaped coupler 314 is assembled by coupling disk extension 318, shaped body 316, and damper extension 322 via any method that enables operation of damper retaining apparatus 302 as described herein. Also, shaped coupler 314 is formed from any material that enables operation of damper retaining apparatus 302 as described herein.

While FIG. 15 shows radial extension 306 and shaped coupler 314 not touching within cavity 322 for clarity, radial extension 306 is extended into cavity 322 with sufficient adhesion to facilitate coupling radial extension 306 to shaped coupler 314 via an interference fit. Shaped coupler 314 of damper retaining apparatus 302 is extended between rotor wheel disk 32 and damper 300, and damper 300 is inserted into cavity 322 to facilitate securing damper 300 against underside 129 of platform 104 via a series of interference fits. Such interference fits facilitate damper 300 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 16:
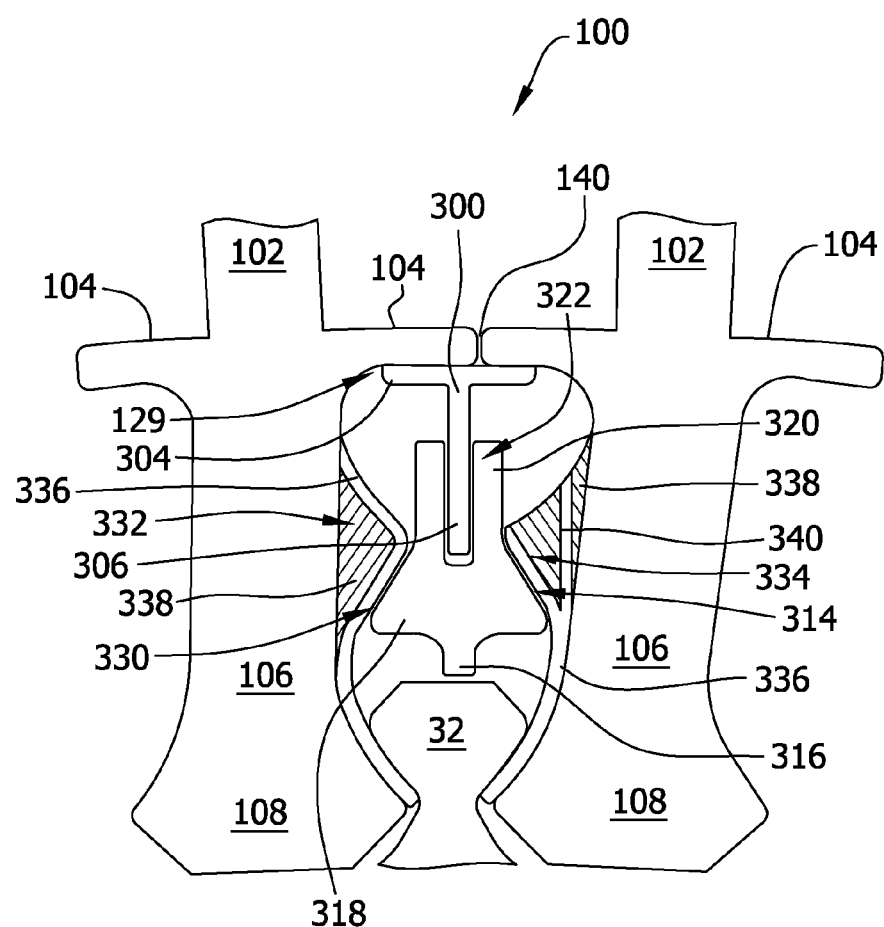

FIG. 16 is an axial view of two adjacent CMC turbine blade assemblies 100 and damper 300 with another alternative damper retaining apparatus 330 coupled to and extending from adjacent blade shanks 106 that may be used with aircraft gas turbine engine 10 (shown in FIG. 1). In this exemplary alternative embodiment, damper retaining apparatus 330 is similar to damper retaining device 302 (shown in FIG. 15) with the exception of at least one of two alternative shank extensions 332 and 334. Shank extension 332 includes an outer rib 336 that is coupled to shaped body 316 via an interference fit and an inner material 338 that is coupled to shank 106 via any method that enables operation of damper retaining apparatus 330 as described herein. Shank extension 334 is similar to shank extension 332 with the exception of that shank extension 334 includes outer rib 336 as well as at least one inner support rib 340. Ribs 336 and 340, and inner material 338 are formed from any materials that enable operation of damper retaining apparatus 330 as described herein.

While FIG. 16 shows radial extension 306 and shaped coupler 314 not touching within cavity 322 for clarity, radial extension 306 is extended into cavity 322 with sufficient adhesion to facilitate coupling radial extension 306 to shaped coupler 314 via an interference fit. Damper retaining apparatus 330 is extended between rotor wheel disk 32 and damper 300, and damper 300 is inserted into cavity 322 to facilitate securing damper 300 against underside 129 of platform 104 via a series of interference fits. Such interference fits facilitate damper 300 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 17:
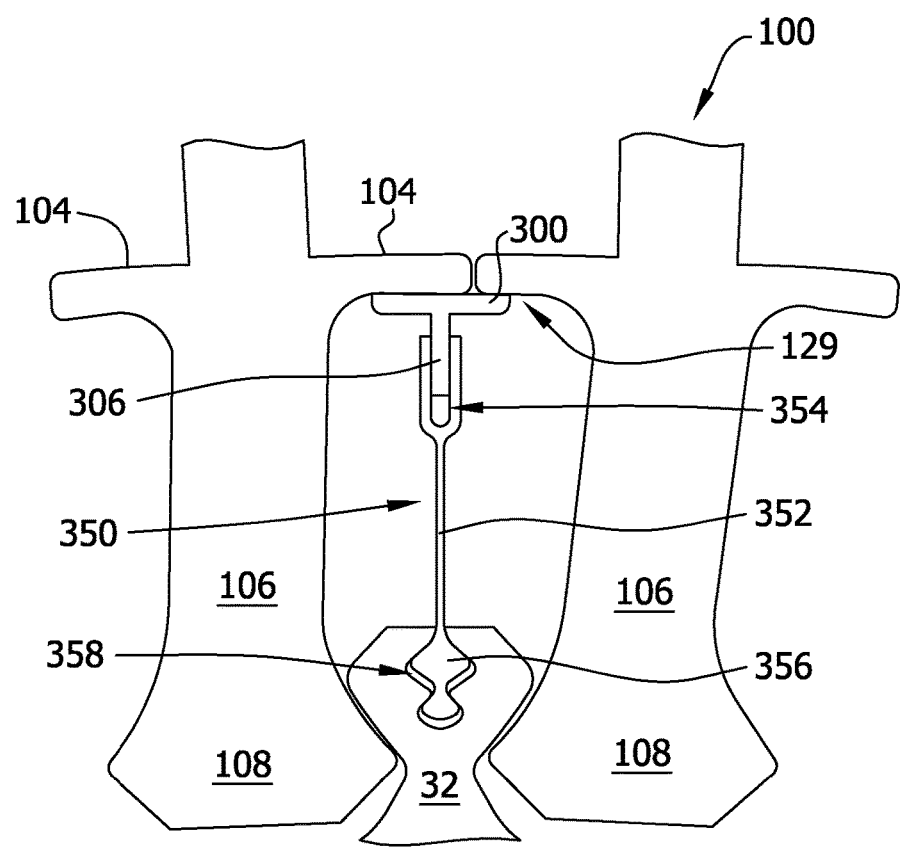

FIG. 17 is an axial view of two adjacent CMC turbine blade assemblies 100 and damper 300 with another alternative damper retaining apparatus 350 coupled to and extending from rotor wheel disk 32 that may be used with aircraft gas turbine engine 10 (shown in FIG. 1). In this exemplary alternative embodiment, damper retaining apparatus 350 includes a disk-to-damper extension 352 that defines a cavity 354 that is complimentary to radial extension 306 of damper 300, and receives extension 306 therein via an interference fit. Damper retaining apparatus 350 also includes a dovetail portion 356 that is complementary to a dovetail cavity 358 defined within rotor wheel disk 32. Therefore, damper retaining apparatus 350 is coupled to rotor wheel disk 32 via an interference fit. In the exemplary embodiment, damper retaining apparatus 350 is unitarily formed. Alternatively, damper retaining apparatus 350 is assembled and/or fabricated via any method that enables operation of damper retaining apparatus 350 as described herein. Also, damper retaining apparatus 350 is formed from any material that enables operation of damper retaining apparatus 350 as described herein.

While FIG. 17 shows radial extension 306 and disk-to-damper extension 352 not touching within cavity 358 for clarity, radial extension 306 is extended into cavity 358 with sufficient adhesion to facilitate coupling radial extension 306 to disk-to-damper extension 352 via an interference fit. Damper retaining apparatus 350 is extended between rotor wheel disk 32 and damper 300, and damper 300 is inserted into cavity 354 to facilitate securing damper 300 against underside 129 of platform 104 via a series of interference fits. Such interference fits facilitate damper 300 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 18:
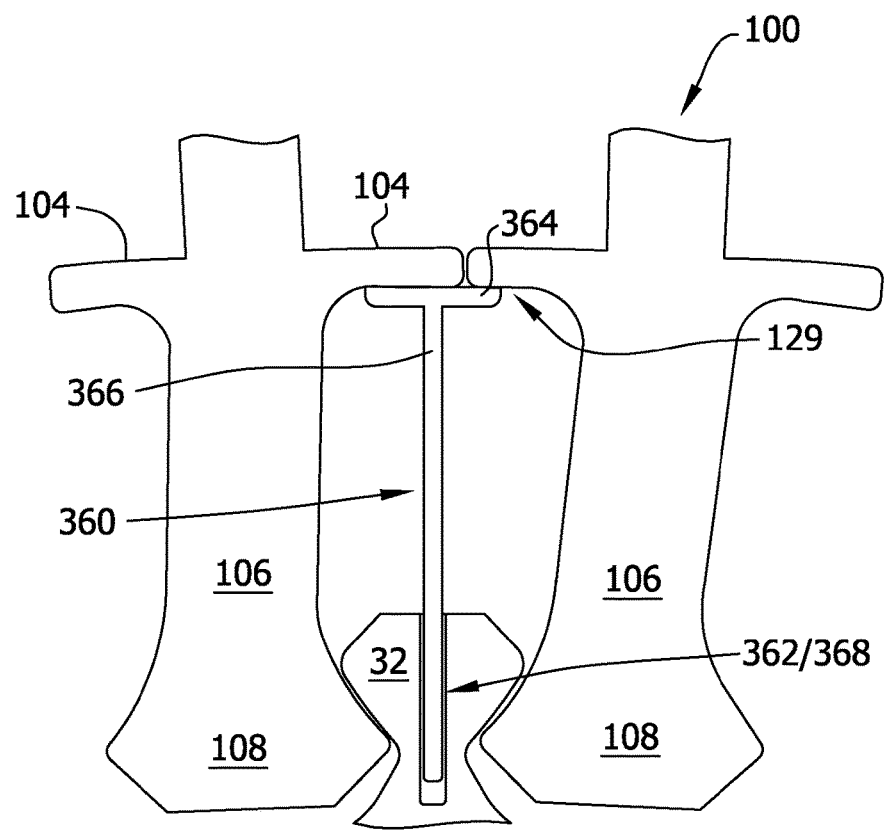

FIG. 18 is an axial view of two adjacent CMC turbine blade assemblies 100 and an exemplary combined damper 360 with a damper retaining apparatus 362 coupled to and extending from rotor wheel disk 32 that may be used with aircraft gas turbine engine 10 (shown in FIG. 1). Alternative damper 360 is substantially T-shaped with a plate portion 364 and an elongated radial extension 366 coupled to plate portion 364. In this exemplary alternative embodiment, damper retaining apparatus 362 includes elongated radial extension 366 extending into a disk cavity 368 defined within rotor wheel disk 32. Disk cavity 368 is complementary to elongated radial extension 366 of damper 360, and receives extension 366 therein via an interference fit. Therefore, damper 360 is coupled to rotor wheel disk 32 via an interference fit. In the exemplary embodiment, damper 360 is unitarily formed. Alternatively, damper 360 is assembled and/or fabricated via any method that enables operation of damper 360 and damper retaining apparatus 362 as described herein. Also, damper 360 is formed from any material that enables operation of damper 360 and damper retaining apparatus 362 as described herein.

While FIG. 18 shows elongated radial extension 366 and rotor wheel disk 32 not touching within cavity 368 for clarity, radial extension 366 is extended into cavity 368 with sufficient adhesion to facilitate coupling radial extension 366 to rotor wheel disk 32 via an interference fit. Damper 360 is extended between rotor wheel disk 32 and is inserted into cavity 368 to facilitate securing damper 360 against underside 129 of platform 104 via a series of interference fits. Such interference fits facilitate damper 360 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 19:
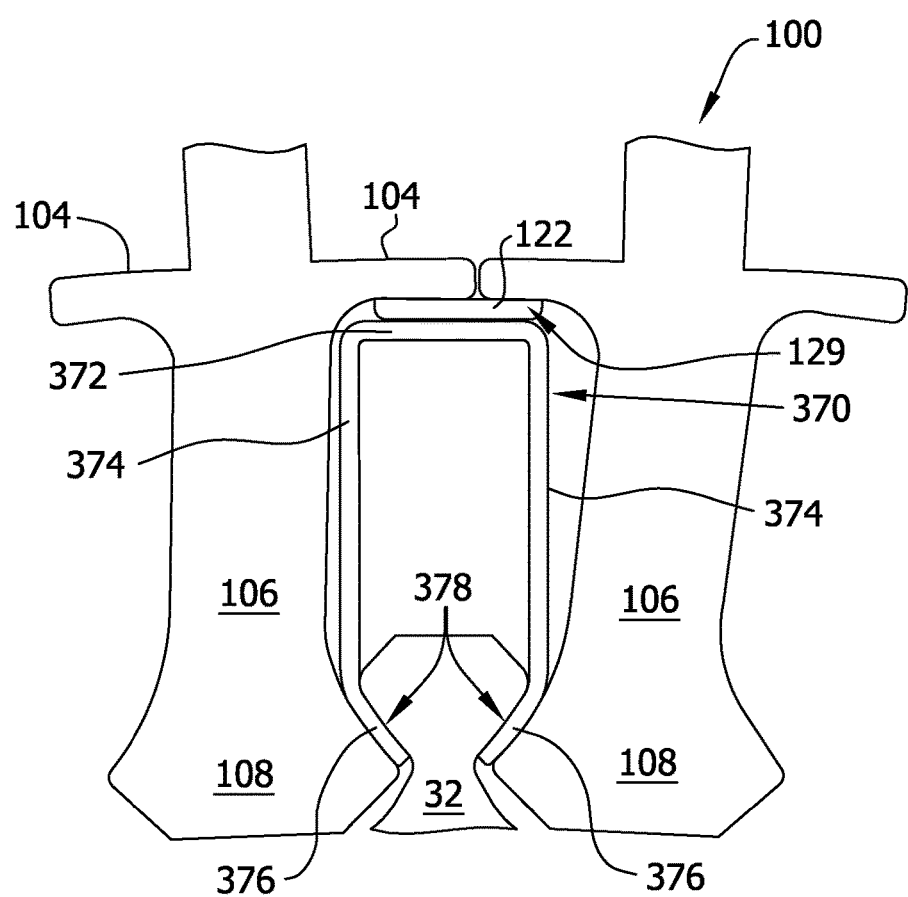

FIG. 19 is an axial view of two adjacent CMC turbine blade assemblies 100 and sheet metal damper 122 with another alternative damper retaining apparatus 370 coupled to and extending from rotor wheel disk 32 that may be used with aircraft gas turbine engine 19 (shown in FIG. 1).

In this exemplary alternative embodiment, damper retaining apparatus 370 includes a damper contact portion 372 that extends substantially circumferentially between adjacent shank portions 106 of adjacent blades 100 and contacts sheet metal damper 122 with an interference fit. Damper retaining apparatus 370 also includes a plurality of radial support extensions 374 coupled to damper contact portion 372. Radial support extensions 374 extend from approximately damper 122 to rotor wheel disk 32. Damper retaining apparatus 370 further includes a plurality of dovetail insertion portions 376, wherein each portion 376 is coupled to an associated radial support extension 374. Each dovetail insertion portion 376 is complementary to a passage 378 defined between dovetail portion 108 of blade 100 and rotor wheel disk 32. Therefore, dovetail insertion portion 376 of damper retaining apparatus 370 is coupled to rotor wheel disk 32 via an interference fit. In the exemplary embodiment, damper retaining apparatus 370 is unitarily formed. Alternatively, damper retaining apparatus 370 is assembled and/or fabricated via any method that enables operation of damper 122 and damper retaining apparatus 370 as described herein. Also, damper retaining apparatus 370 is formed from any material that enables operation of damper 122 and damper retaining apparatus 370 as described herein.

Damper retaining apparatus 370 is extended between damper 122 and rotor wheel disk 32 and is inserted into passages 378 to facilitate securing damper 122 against underside 129 of platform 104 via a series of interference fits. Such interference fits facilitate damper 122 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 20:
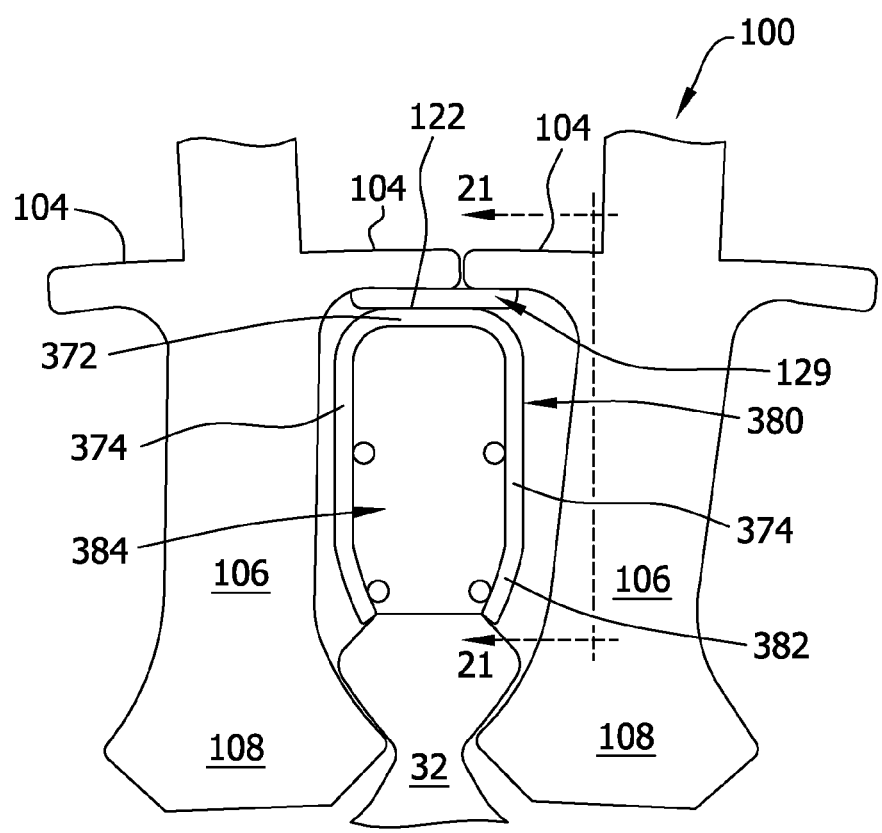

FIG. 20 is an axial view of two adjacent CMC turbine blade assemblies 100 and sheet metal damper 122 with another alternative damper retaining apparatus 380 coupled to and extending from rotor wheel disk 32 that may be used with aircraft gas turbine engine 10 (shown in FIG. 1). FIG.

21 is a cutaway side view of one of CMC turbine blade assemblies 100 and sheet metal damper 122 with alternative damper retaining apparatus 380 taken along line 21-21 (shown in FIG. 20). In this exemplary alternative embodiment, damper retaining apparatus 380 is similar to damper retaining device 370 (shown in FIG. 19) including damper contact portion 372 and radial support extensions 374 coupled to portion 372. However, rather than dovetail insertion portions 376 (shown in FIG. 19), damper retaining apparatus 380 includes a plurality of disk contact portions 382, wherein each portion 382 is coupled to an associated radial support extension 374. In addition, disk contact portions 382 is coupled to rotor wheel disk 32 via an interference fit. Also, damper retaining apparatus 380 differs from damper retaining device 370 with apparatus 380 further including a flexible wire structure 384 coupled to each of damper contact portion 372, radial support extensions 374, disk contact portions 382, and rotor wheel disk 32.

Figure 21:
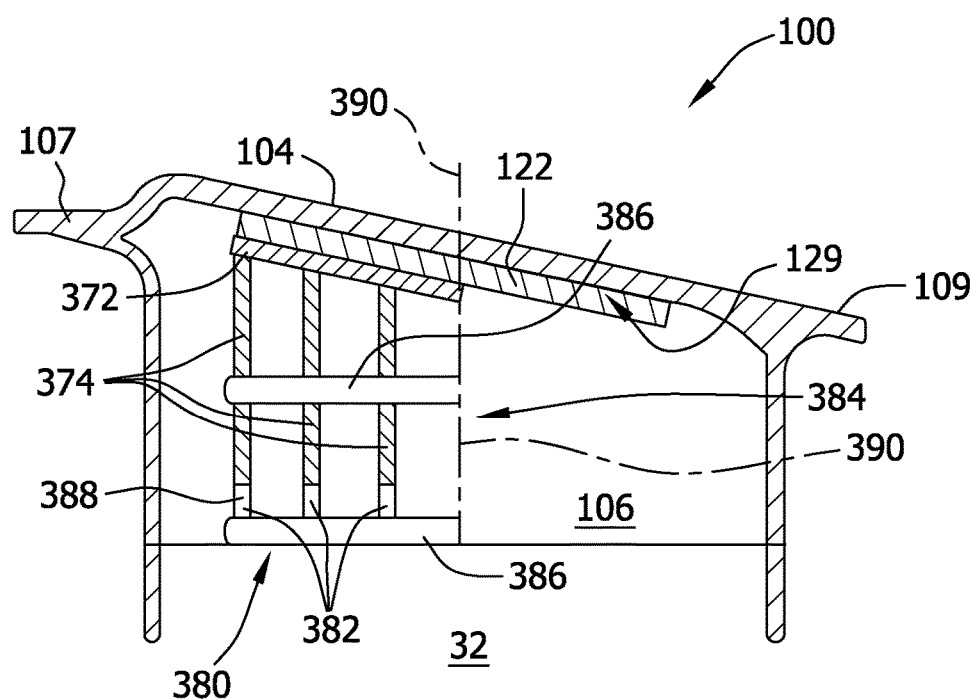

In the exemplary embodiment, flexible wire structure 384 includes a plurality of flexible wires 386 that extend axially aft from a forwardmost radial support extension 388 to any aft portion of sheet metal damper 122 that enables operation of sheet metal damper 122 and damper retaining apparatus 380 as described herein. In FIG. 21, for example, without limitation, flexible wires 386 extend to approximately a blade centerline 390.

Damper retaining apparatus 380 is extended between damper 122 and rotor wheel disk 32 and facilitates securing damper 122 against underside 129 of platform 104 via a series of interference fits. Such interference fits facilitate damper 122 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 22:
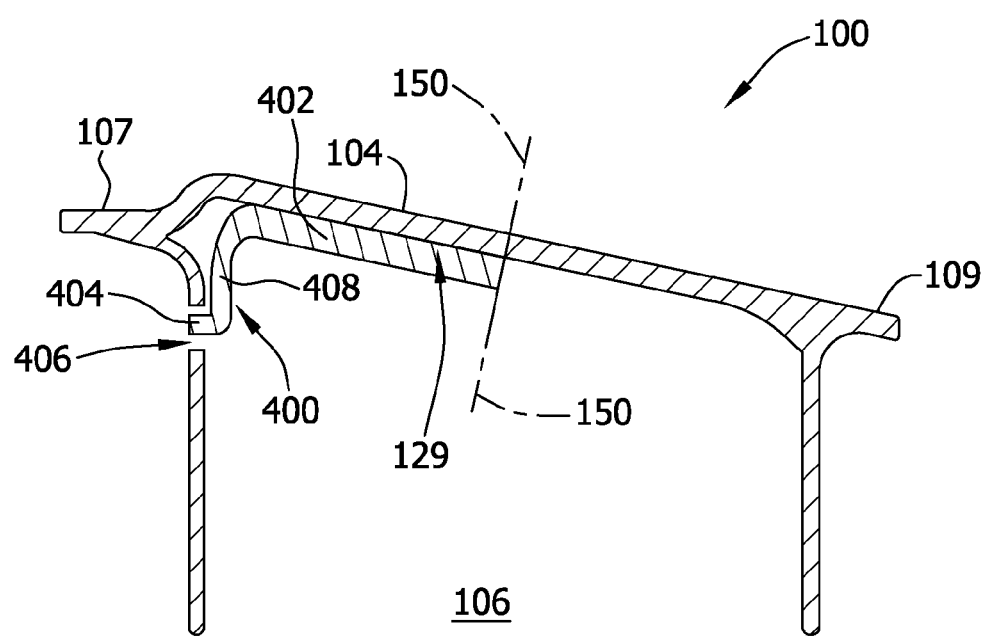

FIG. 22 is a cutaway side view of CMC turbine blade assembly 100 and an exemplary combined damper and slotted retaining apparatus 400 that may be used with aircraft gas turbine engine 10 (shown in FIG. 1). In the exemplary embodiment, combined damper and slotted retaining apparatus 400 includes a platform damper portion 402 that extends along platform underside 129 from a point proximate to forward angel wing 107 to approximately to platform centerline 150. Alternatively, platform damper portion 402 extends any distance along platform underside 129 that enables operation of apparatus 400 as described herein. Combined damper and slotted retaining apparatus 400 also includes a forward angel wing protrusion 404 that extends into a portion of forward angel wing 107 via a slot 406. Combined damper and slotted retaining apparatus 400 further includes an angled portion 408 that couples platform damper portion 402 to forward angel wing protrusion 404, wherein portion 408 has any orientation and configuration that enables operation of apparatus 400 as described herein. In the exemplary embodiment, combined damper and slotted retaining apparatus 400 is unitarily formed. Alternatively, apparatus 400 is assembled and/or fabricated via any method that enables operation of apparatus 400 as described herein. Moreover, apparatus 400 is formed from any materials that enable operation of apparatus 400 as described herein.

Combined damper and slotted retaining apparatus 400 is extended along platform underside 129 of platform 104 any distance from forward angel wing 107 and facilitates securing damper portion 402 against underside 129 via a series of interference fits. In addition, in some alternative embodiments, damper portion 402 may be used to facilitate retaining a damper device, e.g., sheet metal damper 122 (shown in FIGS. 10 and 11), in a manner similar to that performed by retaining apparatus 160 and 162 (shown in FIGS. 10 and 11, respectively). Such interference fits facilitate damper portion 402 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 23:
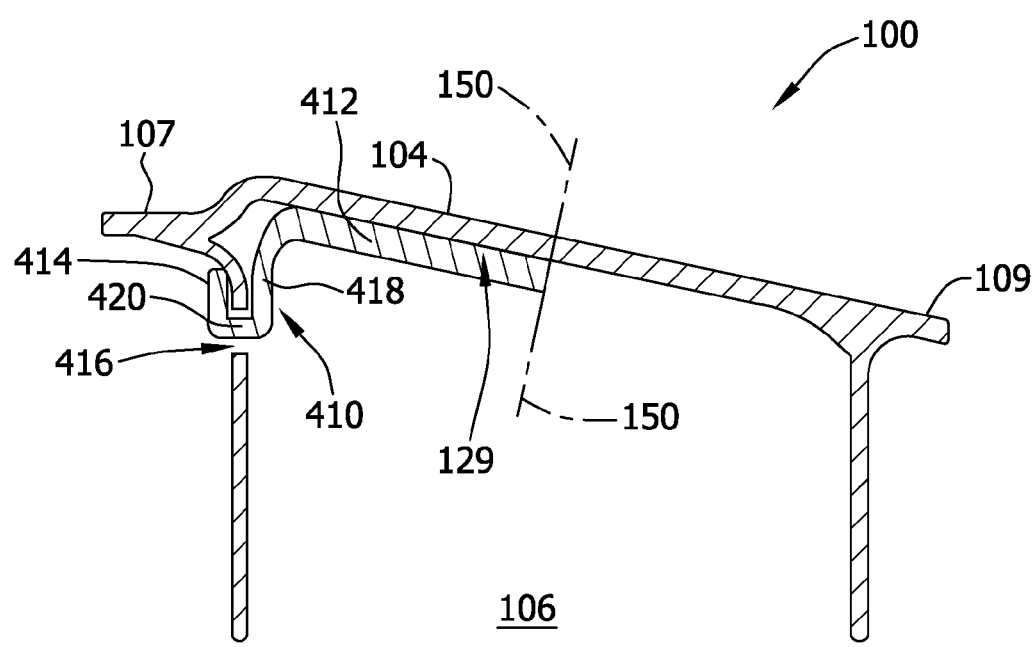

FIG. 23 is a cutaway side view of CMC turbine blade assembly 100 and an exemplary combined damper and clipped retaining apparatus 410 that may be used with aircraft gas turbine engine 10 (shown in FIG. 1). In the exemplary embodiment, combined damper and clipped retaining apparatus 410 includes a platform damper portion 412 that extends along platform underside 129 from a point proximate to forward angel wing 107 to approximately to platform centerline 150. Alternatively, platform damper portion 412 extends any distance along platform underside 129 that enables operation of apparatus 410 as described herein. Combined damper and clipped retaining apparatus 410 also includes a forward angel wing clip 414 that extends through a portion of forward angel wing 107 via a slot 416. Combined damper and clipped retaining apparatus 410 further includes an angled portion 418 that couples platform damper portion 412 to forward angel wing clip 414, wherein portion 418 includes a U-shaped portion 420 and has any additional orientation and configuration that enables operation of apparatus 410 as described herein. In the exemplary embodiment, combined damper and clipped retaining apparatus 410 is unitarily formed. Alternatively, apparatus 410 is assembled and/or fabricated via any method that enables operation of apparatus 410 as described herein. Moreover, apparatus 410 is formed from any materials that enable operation of apparatus 410 as described herein.

Combined damper and clipped retaining apparatus 410 is extended along platform underside 129 of platform 104 any distance from forward angel wing 107 and facilitates securing damper portion 412 against underside 129 via a series of interference fits. In addition, in some alternative embodiments, damper portion 402 may be used to facilitate retaining a damper device, e.g., sheet metal damper 122 (shown in FIGS. 10 and 11), in a manner similar to that performed by retaining apparatus 160 and 162 (shown in FIGS. 10 and 11, respectively). Such interference fits facilitate damper portion 412 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 24:
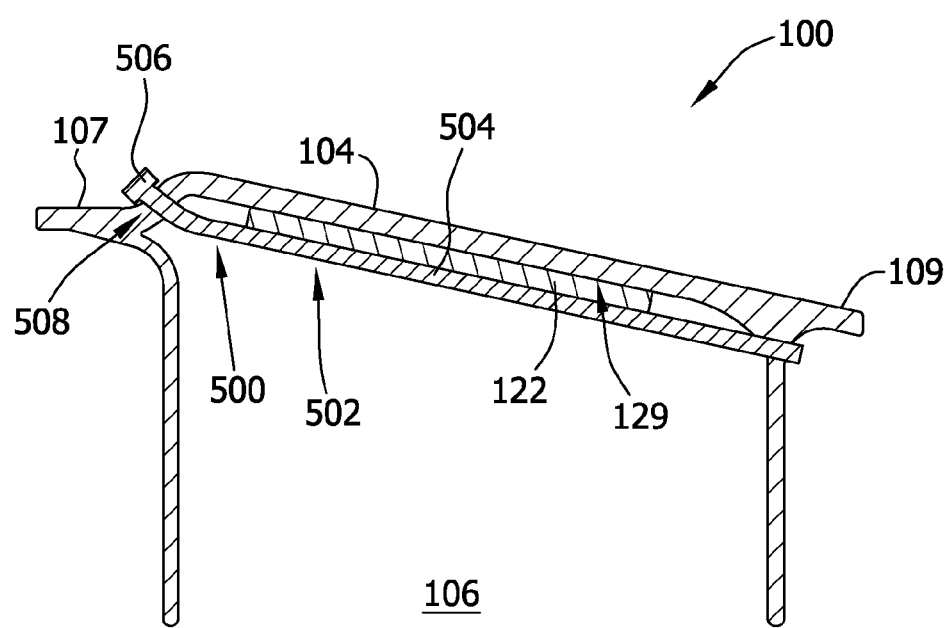

FIG. 24 is a cutaway side view of CMC turbine blade assembly 100 and sheet metal damper 122 and an exemplary pinned damper retaining apparatus 500 that may be used with aircraft turbine engine 10 (shown in FIG. 1). In the exemplary embodiment, pinned damper retaining apparatus 500 includes at least one pin device 502 that extends axially along blade assembly 100 from forward angel wing 107 to aft angel wing 109. Pin device 502 includes a shaft portion 504 that is coupled to sheet metal damper 122 via an interference fit. Pin device 502 also includes a head portion 506 that extends through a slot 508 formed within a portion of forward angel wing 107 and extends at least partially into the working fluid flowpath. Head portion 506 and slot 508 facilitate coupling pin device 502 to blade assembly 100 via an interference fit.

In the exemplary embodiment, pin device 502 is unitarily formed. Alternatively, pin device 502 is assembled and/or fabricated via any method that enables operation of pinned damper retaining apparatus 500 as described herein. Pinned damper retaining apparatus 500 includes any number of pin devices 502 in any configuration and orientation, and formed from any materials that enable operation of apparatus 500 as described herein.

Pinned damper retaining apparatus 500 is extended along sheet metal damper 122 that extends along platform underside 129 of platform 104 from forward angel wing 107 to aft angel wing 109 and facilitates securing sheet metal damper 122 against underside 129 via a series of interference fits. Such interference fits facilitate sheet metal damper 122 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 25:
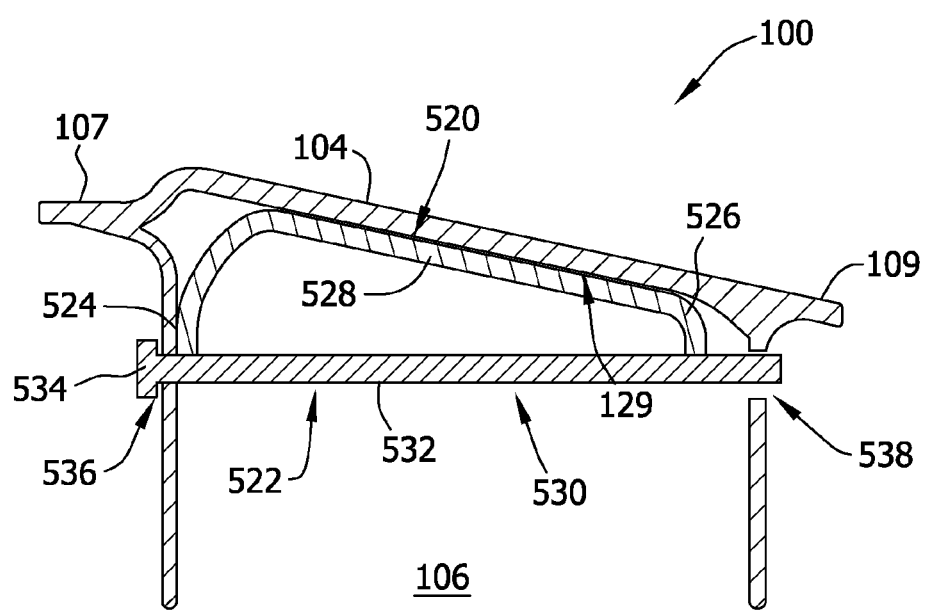

FIG. 25 is a cutaway side view of CMC turbine blade assembly 100 and an exemplary alternative, i.e., mailbox damper 520 and an alternative pinned damper retaining apparatus 522 that may be used with aircraft turbine engine 10 (shown in FIG. 1). In this exemplary alternative embodiment, alternative damper 520 includes a forward pin contact portion 524 and an aft pin contact portion 526, both coupled to a platform contact portion 528.

Also, in this exemplary alternative embodiment, pinned damper retaining apparatus 522 includes at least one pin device 530 that extends axially along blade assembly 100. In contrast to pin device 502 (shown in FIG. 24), pin device 530 extends from forward angel wing 107 to aft angel wing 109 snug to blade assembly 100 rather than positioned in the working fluid flowpath.

Pin device 530 includes a shaft portion 532 that is coupled to forward pin contact portion 524 and aft pin contact portion 526 via an interference fit. Pin device 530 also includes a head portion 534 that extends through a slot 536 formed within a portion of forward angel wing 107. Shaft portion 532 extends through a slot 538 formed within a portion of aft angel wing 109.

In the exemplary embodiment, pin device 530 is unitarily formed. Alternatively, pin device 530 is assembled and/or fabricated via any method that enables operation of pinned damper retaining apparatus 522 as described herein. Pinned damper retaining apparatus 522 includes any number of pin devices 530 in any configuration and orientation, and formed from any materials that enable operation of apparatus 522 as described herein.

Pin device 530 is extended from forward angel wing 107 to aft angel wing 109 a distance below platform underside 129 that facilitates insertion of damper 520 between underside 129 and pin device 530. Platform contact portion 528 of damper 520 extends along platform underside 129 of platform 104 such that an interference fit is attained between underside 129 and platform contact portion 528 to secure damper 520. Also, an interference fit is attained between forward pin contact portion 524 and aft pin contact portion 526, both of damper 520, and pin device 530. Such interference fits facilitate damper 520 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 26:
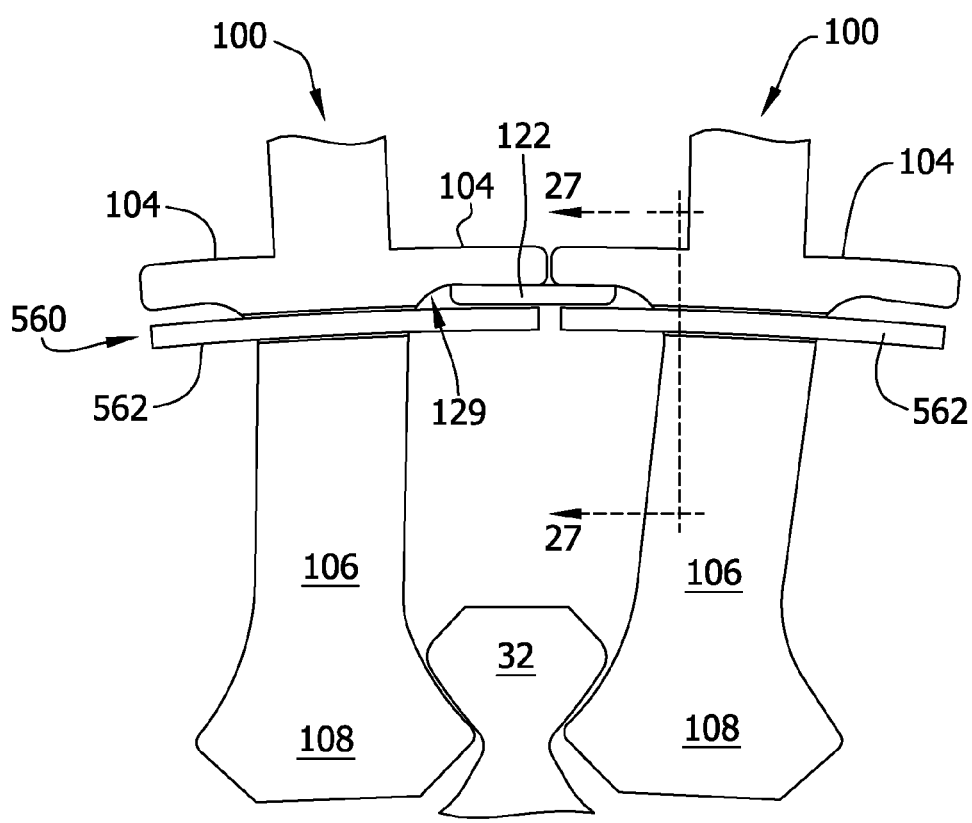
Figure 27:
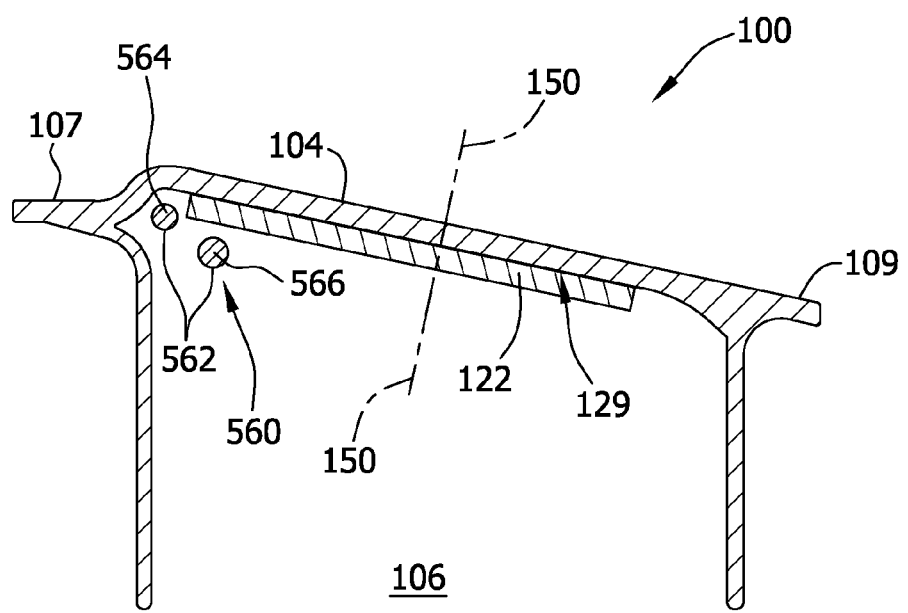

FIG. 26 is an axial view of two adjacent CMC turbine blade assemblies 100 and sheet metal damper 122 and an alternative exemplary pinned damper retaining apparatus 560 that may be used with aircraft turbine engine 10 (shown in FIG. 1). FIG. 27 is a cutaway side view of one of CMC turbine blade assemblies 100 and sheet metal damper 122 and alternative pinned damper retaining apparatus 560 taken along line 27-27 (shown in FIG. 26). In this exemplary alternative embodiment, alternative damper 560 includes a plurality of pin devices 562 extending substantially orthogonally through shank 106 proximate to forward angle wing 107. Alternatively, pin devices 562 may penetrate shank 106 at any point with respect to forward angel wing 107, aft angel wing 109, and platform centerline 150 that enables operation of apparatus 560.

In the exemplary embodiment, each pin device 562 is unitarily formed. Alternatively, pin device 562 is assembled and/or fabricated via any method that enables operation of pinned damper retaining apparatus 560 as described herein. Pinned damper retaining apparatus 560 includes any number of pin devices 562 in any configuration and orientation, and formed from any materials that enable operation of apparatus 560 as described herein.

Pin devices 562 include a first pin device 564 positioned between forward angel wing 107 and sheet metal damper 122 such that pin device 564 facilitates axial positioning and support of damper 122 via an interference fit. Also, pin devices 562 include a second pin device 566 positioned below damper 122 such that pin device 566 facilitates radial positioning and securing of damper 122 against underside 129 of platform 104 via an interference fit. Such interference fits facilitate damper 122 being maintained in position regardless of operation of gas turbine engine 10, such operation including, without limitation, substantially stationary rotor 30 (shown in FIG. 1) conditions, slow rotation of rotor 30 via turning gear (not shown), accelerations to predetermined operating speeds, and subsequent decelerations.

Figure 28:
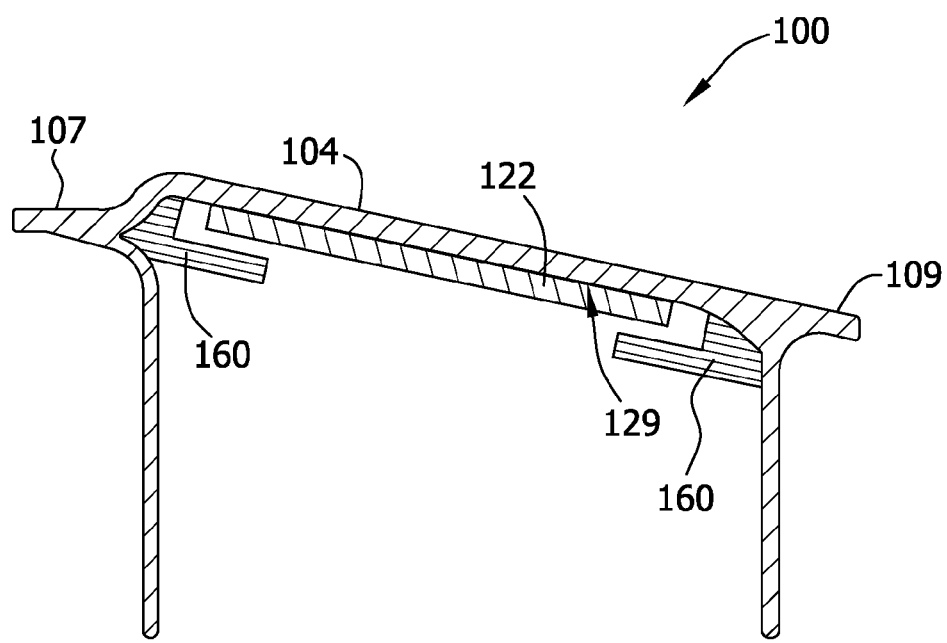

FIG. 28 is a cutaway side view of CMC turbine blade assembly 100 and sheet metal damper 122 with two axially opposing L-bracket retaining apparatus 160 similar to that shown in FIG. 10. In the exemplary embodiment, axially opposing L-bracket retaining apparatus 160 cooperate to retain sheet metal damper 122 against underside 129 of platform 104 via an interference fit.

Figure 29:
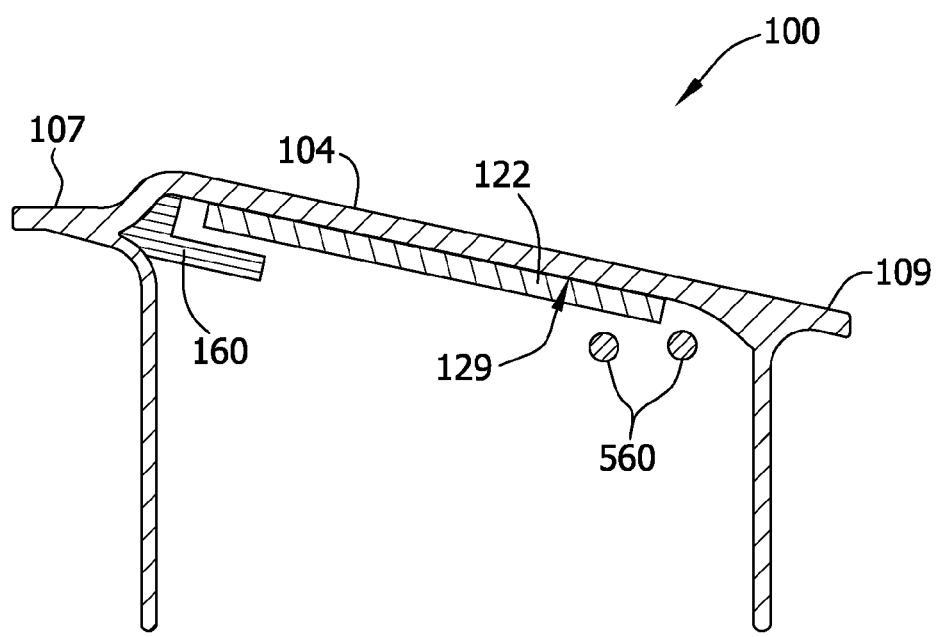

FIG. 29 is a cutaway side view of CMC turbine blade assembly 100 and sheet metal damper 122 with an L-bracket retaining apparatus 160 similar to that shown in FIG. 10 and with a pinned damper retaining apparatus 560 similar to that shown in FIGS. 26 and 27. In the exemplary embodiment, L-bracket retaining apparatus 160 and pinned damper retaining apparatus 560 cooperate to retain sheet metal damper 122 against underside 129 of platform 104 via an interference fit.

Figure 30:
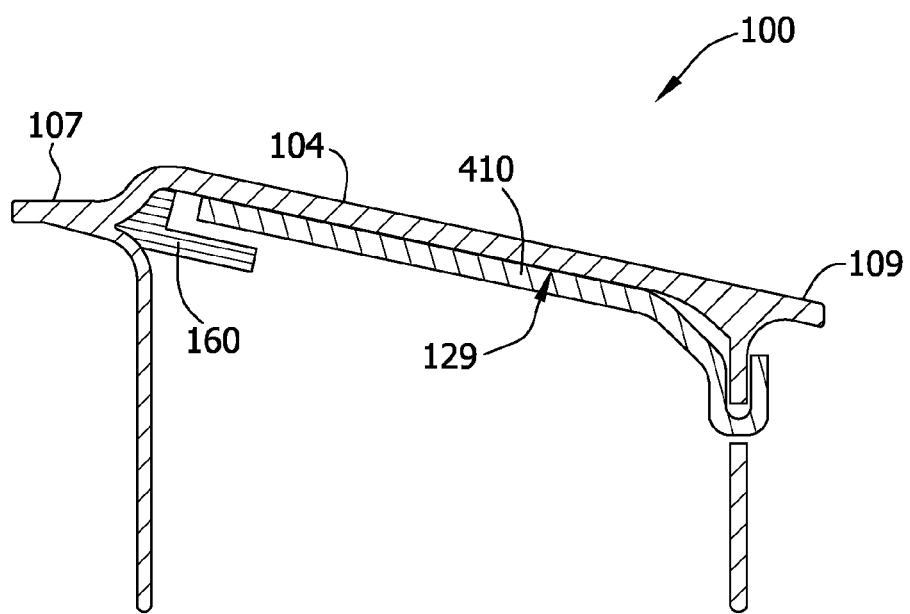

FIG. 30 is a cutaway side view of CMC turbine blade assembly 100 and a combined damper and clipped retaining apparatus 410 similar to that shown in FIG. 23 with an L-bracket retaining apparatus 160 similar to that shown in FIG. 10. In the exemplary embodiment, L-bracket retaining apparatus 160 and combined damper and clipped retaining apparatus 410 cooperate to retain apparatus 410 against underside 129 of platform 104 via an interference fit.

Figure 31:
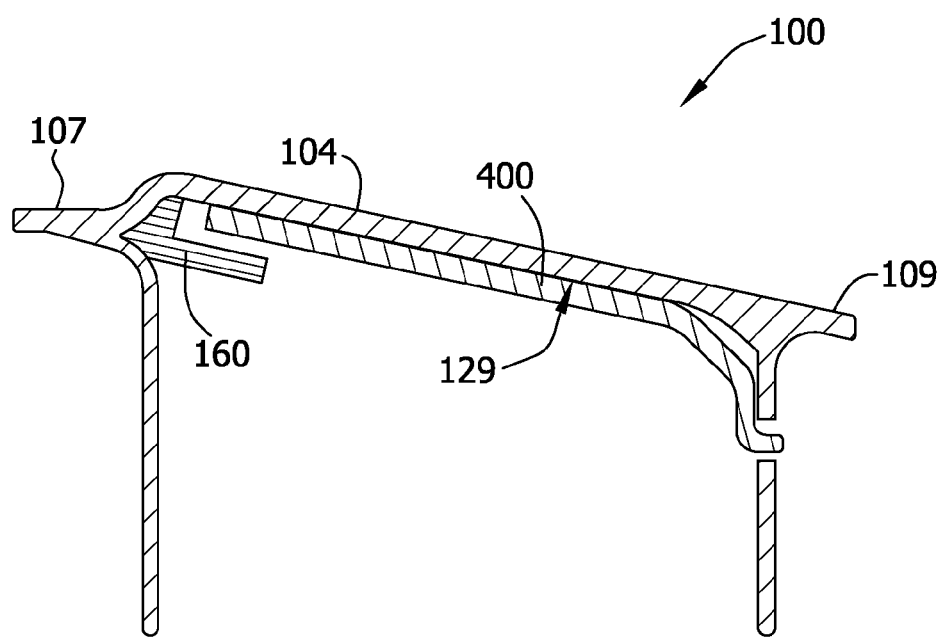

FIG. 31 is a cutaway side view of CMC turbine blade assembly 100 and a combined damper and slotted retaining apparatus 400 similar to that shown in FIG. 22 with an L-bracket retaining apparatus 160 similar to that shown in FIG. 10. In the exemplary embodiment, L-bracket retaining apparatus 160 and combined damper and slotted retaining apparatus 400 cooperate to retain apparatus 400 against underside 129 of platform 104 via an interference fit.

FIGS. 28, 29, 30, and 31 are examples of combinations of embodiments described herein that may be used to facilitate dampening vibrations of blade assembly 100 as described above. Alternatively, any combination of L-bracket retaining apparatus 120 (shown in FIGS. 4 through 9), L-bracket retaining apparatus 160 (shown in FIG. 10), L-bracket retaining apparatus 162 (shown in FIG. 11), ring damper 200 (shown in FIG. 12), ring damper 210 (shown in FIG. 13), ring retaining apparatus 220 (shown in FIG. 14), damper retaining apparatus 302, 330, 350, 362, 370, and 380 (shown in FIGS. 15, 16, 17, 18, 19, and 20, respectively), combined damper and slotted retaining apparatus 400 (shown in FIG. 22), combined damper and clipped retaining apparatus 410 (shown in FIG. 23), exemplary pinned damper retaining apparatus 500 (shown in FIG. 24), pinned damper retaining apparatus 522 (shown in FIG. 25), and pinned damper retaining apparatus 560 (shown in FIG. 26) and their associated dampers (as shown in the respective figures) may be used to enable operation of CMC turbine blade assemblies 100 as described herein.

Figure 32:
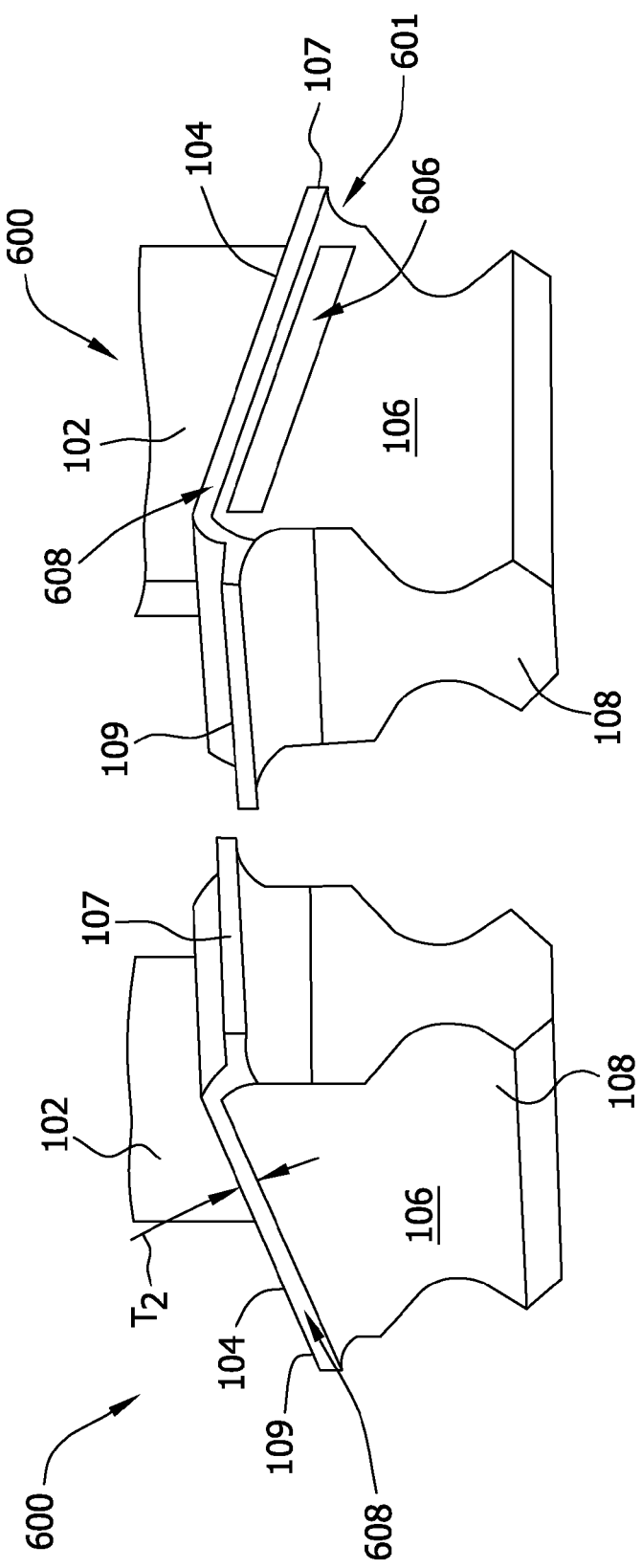
Figure 33:
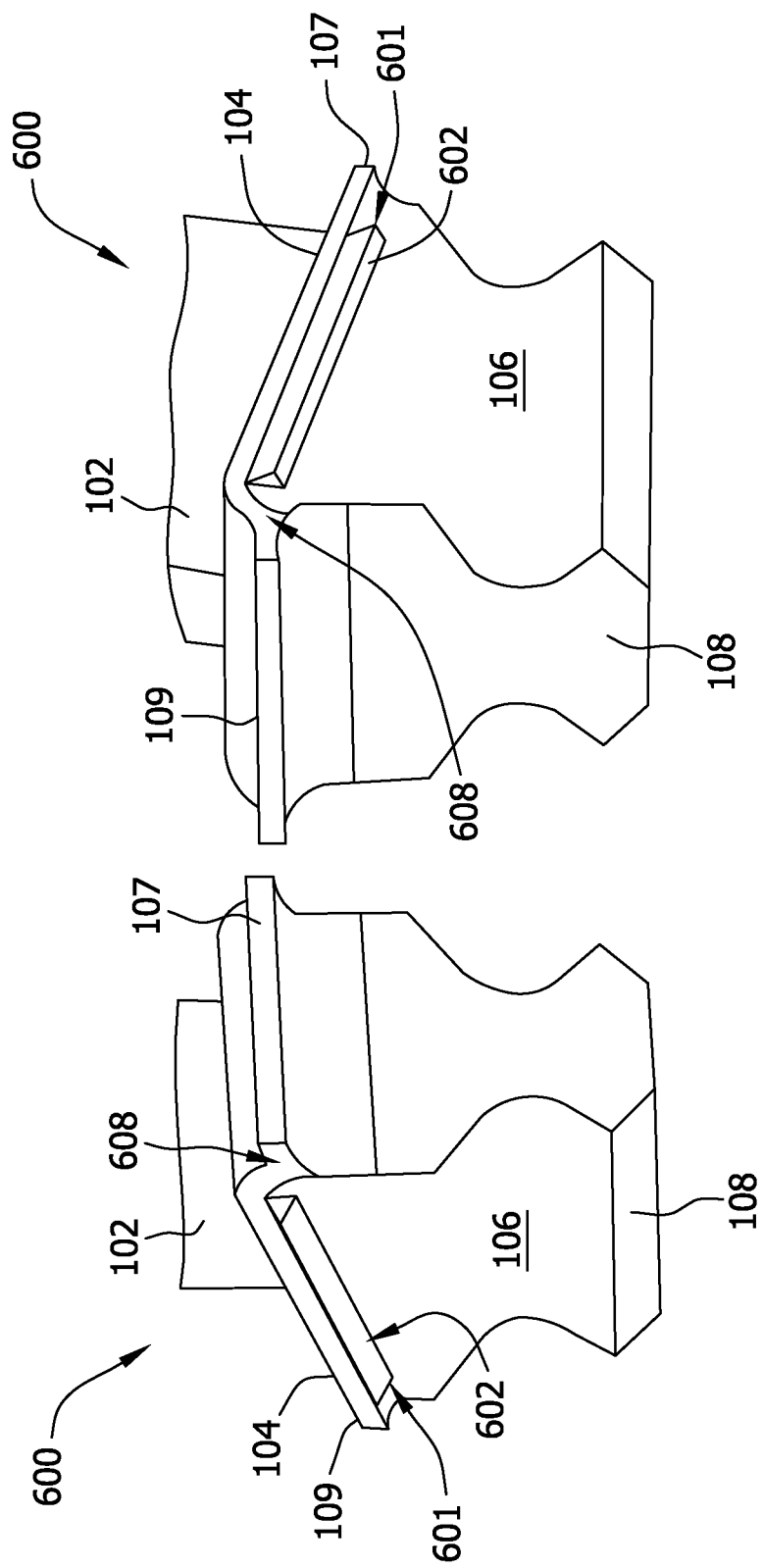
Figure 34:
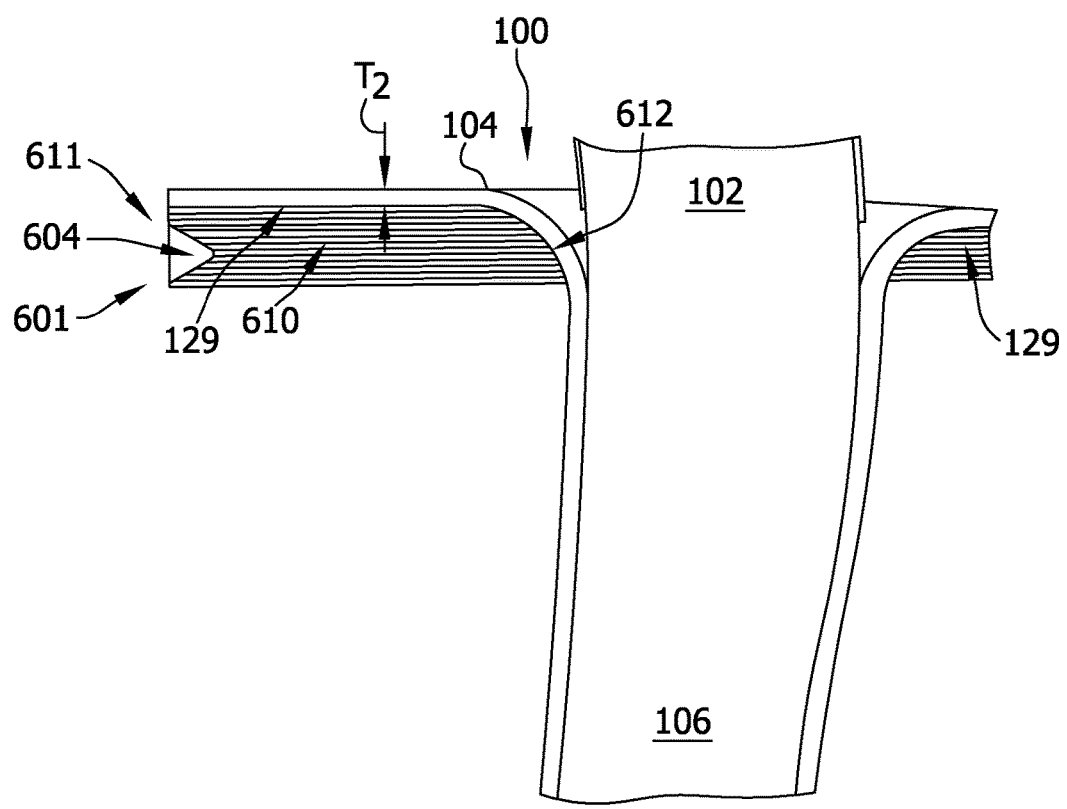

FIG. 32 is a perspective view of two sides of an exemplary alternative CMC turbine blade assembly 600 with an exemplary triangular bar damper retaining apparatus 601. FIG. 33 is a perspective view of two sides of CMC turbine blade assembly 600 and triangular bar damper retaining apparatus 601 with an exemplary triangular bar damper 602 installed. FIG. 34 is a cutaway schematic side view of CMC turbine blade assembly 100 with triangular bar damper retaining apparatus 601 and with a machined triangular pocket 604 defined therein.

Referring to FIG. 32, CMC turbine blade assembly 600 is similar to blade assembly 100 (shown in FIGS. 3 and 34), with the exception that blade assembly 600 has an alternative platform portion 605. In the exemplary embodiment, platform portion 605 has a radial thickness $T_2$ and is referred to a "thick platform configuration." This is in contrast to the "thin platform configuration" described above for platform 104, wherein radial thickness $T_2$ is greater than radial thickness $T_1$. Alternatively, platform portion 605 has any radial thickness that enables operation of blade assembly 600 as described herein.

Also, referring to FIG. 32, some embodiments of triangular bar damper retaining apparatus 601 includes a triangular groove 606 formed into a flat vertical face 608 of platform portion 605. In the exemplary embodiment, triangular groove 606 is formed my machining. Alternatively, triangular groove 606 is formed by any method that enables operation of apparatus 601 as described herein, including, without limitation, casting blade assembly 600 with triangular groove 606 in platform portion 605.

Referring to FIG. 33, triangular bar damper 602 is formed in a substantially triangular shape from a CMC material that is similar to and/or compatible with the CMC material of turbine blade assembly 600. In the exemplary embodiments, triangular bar damper retaining apparatus 601 includes triangular bar damper 602 and triangular groove 606. In the exemplary embodiment, triangular bar damper 602 is sized, configured, and oriented on flat vertical face 608 of a first platform portion 605 to be received and retained within triangular groove 606 of an adjacent flat vertical face 608. Machined triangular pocket 604 and triangular groove 606 is sized to receive and retain triangular bar damper 602 via an interference fit, i.e., without coupling methods such as welding, brazing, and fastener hardware. Moreover, triangular bar damper 602 extends from a platform portion 605 of a first blade assembly 600 to a platform portion 605 of an adjacent blade assembly 600, wherein triangular bar damper 602 is maintained in position via the interference fit.

Referring to FIG. 34, some embodiments of triangular bar damper retaining apparatus 600 include machined pocket 604 formed within a CMC insert 610. Platform 104 and CMC insert 610 define an alternative flat vertical face 611, wherein machined triangular pocket 604 is defined within CMC insert 610. Machined triangular pocket 604 is sized to receive and retain triangular bar damper 602 via an interference fit, i.e., without coupling methods such as welding, brazing, and fastener hardware. An interface 612 is defined between a portion of shank 106 and a portion of underside 129 of platform 104. In this exemplary alternative embodiment, CMC insert 610 is coupled to a portion of underside 129 the portion of shank side wall 106 at interface 612 via an interference fit, i.e., without coupling methods such as welding, brazing, and fastener hardware. In the exemplary embodiment, triangular bar damper retaining apparatus 601 includes triangular bar damper 602 and machined triangular pocket 604. CMC insert 610 is used to make blade assembly 100 with platform portion 104 and thickness $T_1$ compatible with triangular bar retaining apparatus 601. Triangular bar damper 602 is sized, configured, and oriented on flat vertical face 608 of a platform portion 605 to be received and retained within machined triangular pocket 604 of an adjacent flat vertical face 611 of a platform portion 104.

Figure 35:
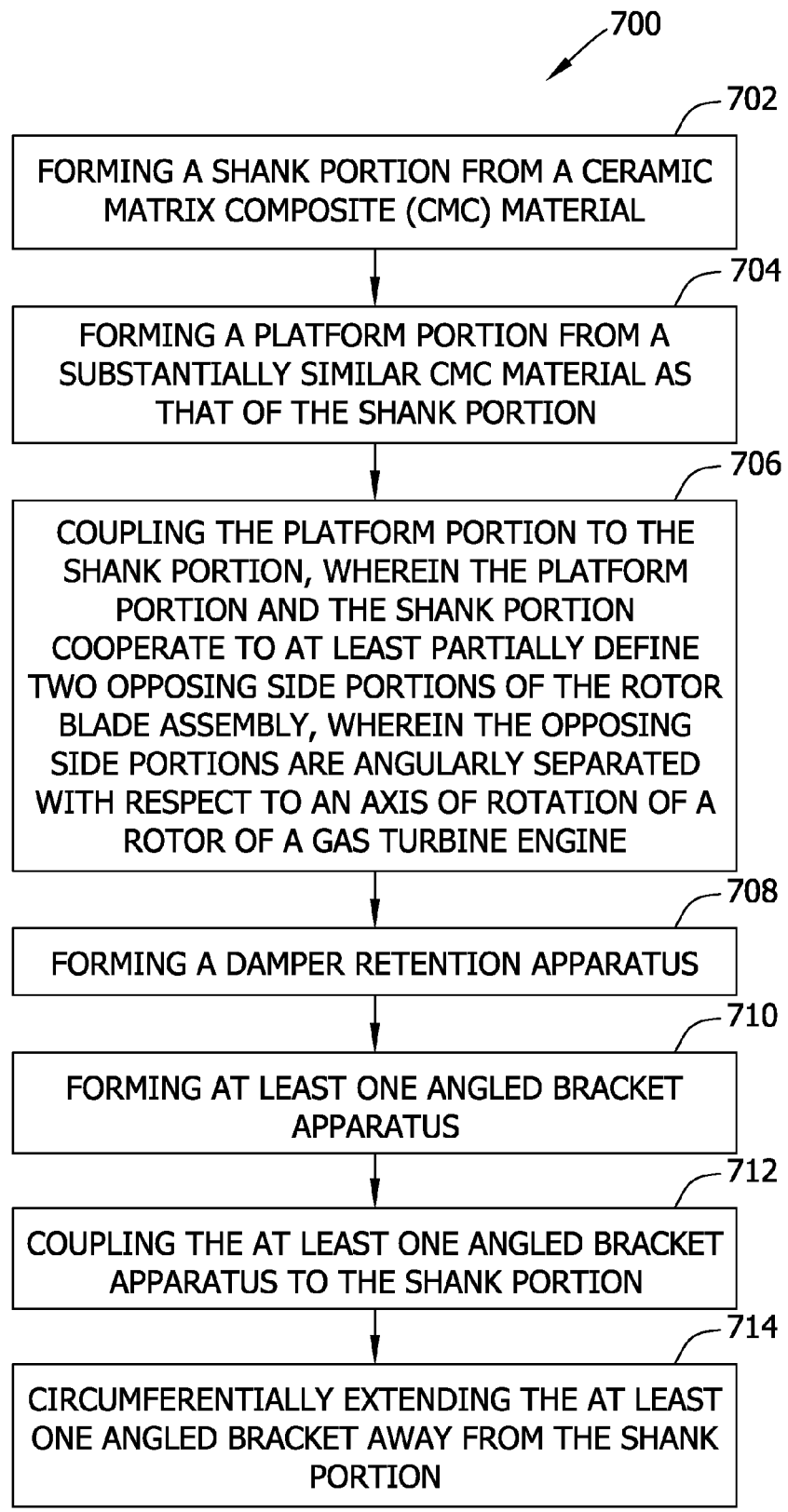

FIG. 35 is a flowchart of an exemplary method 700 of assembling turbine rotor blade assemblies 100 (shown in FIGS. 1-9) as described herein. Shank portion 106 (shown in FIGS. 2-9) is formed 702 from a ceramic matrix composite (CMC) material. Platform portion 104 (shown in FIGS. 2-9) is formed 704 from a substantially similar CMC material as that of shank portion 106. Platform portion 104 is coupled 706 to shank portion 106. Platform portion 104 and shank portion 106 cooperate to at least partially define two opposing side portions 128 (shown in FIGS. 4 and 5) of rotor blade assembly 100. Opposing side portions 128 are angularly separated with respect to an axis of rotation 8 (shown in FIG. 1) of a rotor 30 (shown in FIG. 1) of a gas turbine engine 10 (shown in FIG. 1). Damper retention apparatus 120 (shown in FIGS. 4-9) is formed 708. At least one angled bracket apparatus 120 is formed 710. Angled bracket apparatus 120 is coupled 712 to shank portion 106. Angled bracket apparatus 120 is circumferentially extended 714 away from shank portion 106.

The above-described embodiments of methods and apparatus of the turbine blade dampening apparatus for CMC aircraft turbine blades reduce vibration in the turbine blades, thereby reducing excitation stresses, increasing the strain tolerance of the blade shanks, and increasing a capability to handle wakes from other components in the engine. The blade dampening apparatus described herein may be coupled to the blade shank, blade platform, forward and/or aft angel wings, and the rotor disk. Also, the blade dampening apparatus may be oriented and configured as necessary to facilitate vibration dampening on a variety of blade designs and types. Furthermore, the embodiments described herein may be used independently and exclusively, as well as conjunctively and interchangeably. Therefore, existing aircraft gas turbines may be retrofitted with the blade dampening apparatus described herein. Moreover, the blade dampening apparatus may receive a coating, including, without limitation, friction coatings, wear coatings, recession coatings (e.g., environmental barrier coatings), and thermal barrier coatings. Also, the various embodiments described herein are configured and oriented within the turbine such that they will remain in place when the turbine rotor is slowed or stopped. As a result, the methods and apparatus described herein facilitate aircraft operations in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor blade assembly for a rotor of a gas turbine engine having an axis of rotation, said rotor blade assembly comprising:
    a shank portion formed from a ceramic matrix composite (CMC) material;
    a platform portion formed from the same CMC material as that of said shank portion, said platform portion coupled to said shank portion, wherein said platform portion and said shank portion cooperate to at least partially define two opposing side portions of said rotor blade assembly, wherein said opposing side portions are angularly separated with respect to the axis of rotation;
    a damper; and
    a damper retention apparatus, wherein at least a portion of said damper retention apparatus is coupled to said shank portion, said damper retention apparatus comprises at least one angled bracket apparatus extending toward a circumferentially adjacent rotor blade assembly, wherein said at least one angled bracket apparatus comprises a first portion and a second portion, said second portion coupled to said first portion, said first portion and said second portion define an angle therebetween, said first portion coupled to said shank portion, said second portion extends outwardly from said shank portion toward an adjacent shank portion of the circumferentially adjacent rotor blade assembly, wherein said damper retention apparatus comprises a CMC insert coupled to an interface defined by a side wall of said shank portion and an underside of said platform portion via a first interference fit and the CMC insert is coupled to the platform underside, the interface, and the second portion, wherein a pocket is formed within said CMC insert, said pocket is sized and oriented to receive at least a portion of said damper via a second interference fit, and
    wherein said damper is retained in said damper retention apparatus via the second interference fit.

2. A rotor blade assembly in accordance with claim 1, wherein said at least one angled bracket apparatus is formed from the same CMC material as that of said shank portion and said platform portion.

3. A rotor blade assembly in accordance with claim 2, wherein said at least one angled bracket apparatus is formed substantially unitarily with said shank portion and said platform portion.

4. A rotor blade assembly in accordance with claim 1 further comprising:
    said at least one angled bracket apparatus coupled to a first side of said two opposing side portions; and
    said CMC insert coupled to a second side of said two opposing side portions.

5. A rotor assembly for a gas turbine engine having an axis of rotation, said rotor assembly comprising:
    a rotor disk defining a periphery thereon;
    a plurality of rotor blades coupled to said periphery of said rotor disk, said plurality of rotor blades positioned substantially circumferentially adjacent to each other in an angularly spaced relationship with respect to the axis of rotation, wherein each of said rotor blades comprises:
    a shank portion formed from a ceramic matrix composite (CMC) material;
    a platform portion formed from the same CMC material as that of said shank portion, said platform portion coupled to said shank portion, wherein said platform portion and said shank portion cooperate to at least partially define two opposing side portions of each of said rotor blades, wherein said opposing side portions are angularly separated with respect to the axis of rotation;
    a damper; and
    a damper retention apparatus, wherein at least a portion of said damper retention apparatus is coupled to said shank portion, said damper retention apparatus comprises at least one angled bracket apparatus extending toward said circumferentially adjacent rotor blade, wherein said at least one angled bracket apparatus comprises a first portion and a second portion, said second portion coupled to said first portion, said first portion and said second portion define an angle therebetween, said first portion coupled to said shank portion, said second portion extends outwardly from said shank portion toward an adjacent shank portion of the circumferentially adjacent rotor blade assembly, wherein said damper retention apparatus comprises a CMC insert coupled to an interface defined by a side wall of said shank portion and an underside of said platform portion via a first interference fit and the CMC insert is coupled to the platform underside, the interface, and the second portion, wherein a pocket is formed within said CMC insert, said pocket is sized and oriented to receive at least a portion of said damper via a second interference fit, and
    wherein said damper is retained in said damper retention apparatus via the second interference fit.

6. A rotor assembly in accordance with claim 5, wherein said at least one angled bracket apparatus is formed from a substantially similar CMC material as that of said shank portion and said platform portion.

7. A rotor assembly in accordance with claim 6, wherein said at least one angled bracket apparatus is formed substantially unitarily with said shank portion and said platform portion.

8. A rotor assembly in accordance with claim 5 further comprising:
    said at least one angled bracket apparatus coupled to a first side of said two opposing side portions; and
    said CMC insert coupled to a second side of said two opposing side portions,
    wherein, said at least one angled bracket apparatus coupled to a first of said rotor blades and said CMC insert coupled to said circumferentially adjacent rotor blade are complementary such that said angled bracket apparatus, said CMC insert, and the damper positioned between said at least one angled bracket apparatus and said platform portion remain substantially in position via a series of interference fits throughout acceleration, deceleration, and substantially stationary operation of said rotor assembly.

9. A method of assembling a rotor blade assembly, said method comprising:

forming a shank portion from a ceramic matrix composite (CMC) material;

forming a platform portion from the same CMC material as that of the shank portion;

coupling the platform portion to the shank portion, wherein the platform portion and the shank portion cooperate to at least partially define two opposing side portions of the rotor blade assembly, wherein the opposing side portions are angularly separated with respect to an axis of rotation of a rotor of a gas turbine engine;

forming a damper retention apparatus comprising:

forming at least one angled bracket apparatus comprising forming a first portion of the at least one angled bracket apparatus; forming a second portion of the at least one angled bracket apparatus; coupling the first portion to the second portion, wherein the first portion and the second portion define an angle therebetween; coupling the first portion to the shank portion; and circumferentially extending the second portion away from the shank portion;

forming a CMC insert;

coupling the CMC insert to an interface defined by a side wall of the shank portion and an underside of the platform portion by a first interference fit and the CMC insert is coupled to the platform underside, the interface, and the second portion; and forming a pocket within the CMC insert such that the pocket is sized and oriented to receive at least a portion of the damper via a second interference fit;

and inserting a damper into said damper retention apparatus, wherein said damper is retained in said damper retention apparatus via the second interference fit.

10. A method in accordance with claim 9, wherein forming at least one angled bracket apparatus comprises forming the at least one angled bracket apparatus from the same CMC material as that of the shank portion and the platform portion.

11. A method in accordance with claim 10 further comprising forming the at least one angled bracket apparatus substantially unitarily with the shank portion and the platform portion.

* * * * *